(12) United States Patent
Srivastava et al.

(10) Patent No.: US 11,636,537 B2
(45) Date of Patent: Apr. 25, 2023

(54) SYSTEM AND METHODS OF PROVIDING POINT-OF-NEED FINANCING

(71) Applicant: StreamSource Technologies, New York, NY (US)

(72) Inventors: Tushar Srivastava, New York, NY (US); Prerit Srivastava, Gurugram (IN); Mayank Tewari, Gurugram (IN)

(73) Assignee: StreamSource Technologies, New York, NY (US)

( * ) Notice: Subject to any disclaimer, the term of this patent is extended or adjusted under 35 U.S.C. 154(b) by 112 days.

(21) Appl. No.: 16/365,312

(22) Filed: Mar. 26, 2019

(65) Prior Publication Data
US 2020/0311808 A1 Oct. 1, 2020

(51) Int. Cl.
*G06Q 20/00* (2012.01)
*G06Q 40/02* (2023.01)
(Continued)

(52) U.S. Cl.
CPC ......... *G06Q 40/025* (2013.01); *G06Q 10/067* (2013.01); *G06Q 20/20* (2013.01); *G06F 16/27* (2019.01)

(58) Field of Classification Search
CPC ..... G06Q 40/025; G06Q 10/067; G06Q 20/20
(Continued)

(56) References Cited

U.S. PATENT DOCUMENTS 5,995,947 A 11/1999 Fraser et al.
6,029,149 A * 2/2000 Dykstra ................. G06Q 40/00
705/38
(Continued)

FOREIGN PATENT DOCUMENTS

AU 752770 B2 9/2002
AU 785202 B2 11/2006
(Continued)

OTHER PUBLICATIONS

Restriction Requirement dated Apr. 24, 2020, U.S. Appl. No. 16/352,397, filed Mar. 13, 2019.
(Continued)

*Primary Examiner* — Rokib Masud
(74) *Attorney, Agent, or Firm* — Andrew Metrailer; Elexis Jones

(57) ABSTRACT

A method of providing a loan credit to a customer before the customer requests the loan comprises obtaining, by a server, personal information for a customer by a credit broker application executing on the server, executing, on the server, a plurality of lender approval models using the personal information for the customer as input to each lender approval model, where each lender approval model is stored on the computer system in a byte code format as part of a private blockchain system, generating, by the server, a plurality of loan, evaluating, by a credit broker application executing on the server, the plurality of loan approvals based on a credit broker rule set, selecting, by the credit broker application, one of the loan approvals by the credit broker application, and presenting information to the customer comprising the terms of the selected loan approval by the credit broker application.

18 Claims, 10 Drawing Sheets

(51) Int. Cl.
  *G06Q 20/20* (2012.01)
  *G06Q 10/067* (2023.01)
  *G06F 16/27* (2019.01)
(58) Field of Classification Search
  USPC .................................................... 705/16, 21
  See application file for complete search history.

(56) References Cited

U.S. PATENT DOCUMENTS

| | | |
|---|---|---|
| 6,684,393 B1 | 1/2004 | Loen et al. |
| 7,013,290 B2 | 3/2006 | Ananian |
| 7,630,933 B2 | 12/2009 | Peterson et al. |
| 10,366,053 B1 | 7/2019 | Zheng et al. |
| 10,469,534 B2 | 11/2019 | Qureshi et al. |
| 10,909,533 B2 | 2/2021 | Srivastava et al. |
| 2004/0103065 A1 | 5/2004 | Kishen et al. |
| 2005/0187860 A1* | 8/2005 | Peterson .............. G06Q 40/025 705/38 |
| 2006/0129478 A1 | 6/2006 | Rees |
| 2006/0178983 A1 | 8/2006 | Nice et al. |
| 2008/0210754 A1 | 9/2008 | Lovett |
| 2009/0094060 A1 | 4/2009 | Johnson et al. |
| 2010/0332617 A1 | 12/2010 | Goodwin et al. |
| 2011/0004527 A1* | 1/2011 | Ash ...................... G06Q 20/204 705/17 |
| 2011/0313913 A1 | 12/2011 | Bennett et al. |
| 2013/0080336 A1 | 3/2013 | Van Wie et al. |
| 2014/0214554 A1 | 7/2014 | Lang et al. |
| 2014/0358765 A1 | 12/2014 | Agius et al. |
| 2015/0278779 A1 | 10/2015 | Pfeifer |
| 2016/0055474 A1 | 2/2016 | Syed |
| 2016/0171555 A1 | 6/2016 | Buerger et al. |
| 2016/0371771 A1 | 12/2016 | Serrano et al. |
| 2017/0039330 A1 | 2/2017 | Tanner, Jr. et al. |
| 2017/0046526 A1 | 2/2017 | Chan et al. |
| 2017/0206562 A1 | 7/2017 | Mowry |
| 2017/0230375 A1* | 8/2017 | Kurian ................. G06Q 20/382 |
| 2018/0067736 A1 | 3/2018 | De Zaeytijd et al. |
| 2018/0075527 A1 | 3/2018 | Nagla et al. |
| 2018/0293553 A1 | 10/2018 | Debmo et al. |
| 2018/0322561 A1 | 11/2018 | Arora |
| 2019/0149429 A1 | 5/2019 | Stocker |
| 2019/0229921 A1 | 7/2019 | Pulsifer |
| 2020/0294037 A1 | 9/2020 | Srivastava et al. |

FOREIGN PATENT DOCUMENTS

| | | |
|---|---|---|
| WO | 2020186019 A1 | 9/2020 |
| WO | 2020198203 A1 | 10/2020 |

OTHER PUBLICATIONS

Office Action dated Jul. 24, 2020, U.S. Appl. No. 16/352,397, filed Mar. 13, 2019.
Foreign Communication from a Related Counterpart—International Search Report and Written Opinion, dated Jul. 20, 2020, PCT/US2020/022318, filed on Mar. 12, 2020.
Srivastava, Tushar, et al., "System and Methods of Securely Matching a Buyer to a Seller," Mar. 13, 2019, U.S. Appl. No. 16/352,397.
Notice of Allowance dated Nov. 25, 2020, U.S. Appl. No. 16/352,397, filed Mar. 13, 2019.
Foreign Communication from a Related Counterpart—International Preliminary Report on Patentability, dated Sep. 23, 2021, PCT/US2020/022318, filed on Mar. 12, 2020.
Foreign Communication from a Related Counterpart—International Preliminary Report on Patentability, dated Oct. 7, 2021, PCT/US2020/022318, filed on Mar. 12, 2020.

* cited by examiner

SYSTEM AND METHODS OF PROVIDING POINT-OF-NEED FINANCING

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Consumers and merchants interact in a number of ways in today's markets. In general, merchants require certain information about a consumer (e.g., a merchant needs information about a customer who is buying a product from the merchant) in order to complete a transaction with the consumer, including information of a personal or sensitive nature for individuals or companies. Often this information is transferred prior to the completion of the transaction to demonstrate that the consumer has the assets to close the transaction to the satisfaction of the merchant. During this process, the sensitive information may be disclosed, and if the transaction is not completed, there is no way for the consumer to protect the information.

One such situation is the lending markets where a company or consumer may seek credit from a lender. Credit mechanisms provide a foundation for much of retail business. Consumers who have an income that is insufficient may be enabled by lending mechanisms to purchase retail products such as furniture, vehicles, and houses that otherwise they would not purchase. Such credit mechanisms add vigor to national economies and build the standards of living of citizens. Lenders may take into consideration a variety of factors in evaluating whether to lend money to a consumer and/or what kind of credit product to offer to the consumer. For example, a consumer history of borrowing and paying back prior credit loans, a consumer employment history, consumer personal information, and/or a consumer income may be evaluated. In many cases, lenders may obtain consumer information from a third party, for example from a credit bureau. The credit bureau may provide, with the consumer's permission, such personal identifiable information (PII) to the lender. Alternatively, in some cases, the credit bureau may provide instead, or in addition, a credit score.

SUMMARY

In some embodiments, a method of providing a loan credit to a customer before the customer requests the loan comprises obtaining personal information for a customer by a credit broker application executing on the server, executing a plurality of lender approval models using the personal information for the customer as input to each lender approval model, where each lender approval model is stored as part of a private blockchain system, generating a plurality of loan approvals in response to executing the plurality of lender approval models, evaluating, by a credit broker application, the plurality of loan approvals based on a credit broker rule set, selecting, by the credit broker application, one of the loan approvals by the credit broker application based on the evaluating, and presenting information to the customer comprising the terms of the selected loan approval by the credit broker application, wherein the information comprises a maximum loan amount and a loan validity time period. The credit is made available to the customer before the customer presents goods to be purchased at a point-of-sale (POS) station.

In some embodiments, a computer system for mediating loans to customers comprises a processor, a non-transitory memory, a plurality of lender approval models stored in the memory in byte code format as part of a private blockchain system that each analyzes personal information for a customer to produce a credit rejection response or a credit approval response, wherein a credit approval response comprises a maximum loan amount and a loan validity time period, and a credit broker application that, when executed by the processor, obtains personal information on the customer, evaluates a plurality of loan approval responses associated with the customer that are output by the lender credit models based on a credit broker rule set, selects one of the loan approvals based on the evaluating, and presents information to the customer comprising the terms of the selected loan approval, wherein the information comprises the maximum loan amount and the loan validity time period of the selected loan approval, wherein credit is made available to the customer before the customer presents goods to be purchased at a point-of-sale (POS) station.

In some embodiments, a method of providing credit to a customer comprises executing a plurality of lender credit models based on a credit report of a customer, wherein each of the executed credit models output a credit rejection response or a credit approval response and wherein the lender credit models are stored in byte code format, based on a selected credit approval response, sending a request by a credit broker application for a virtual credit card to a banking partner, where the request identifies a credit dollar amount and a loan validity time period, receiving an encrypted message comprising the requested virtual credit card by the credit broker application from the banking partner, and sending the encrypted message by the credit broker application to a personal card information (PCI) vendor, whereby a virtual credit card with a credit limit defined by the credit dollar amount where the credit is available to the customer for a time duration defined by the loan validity time period.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
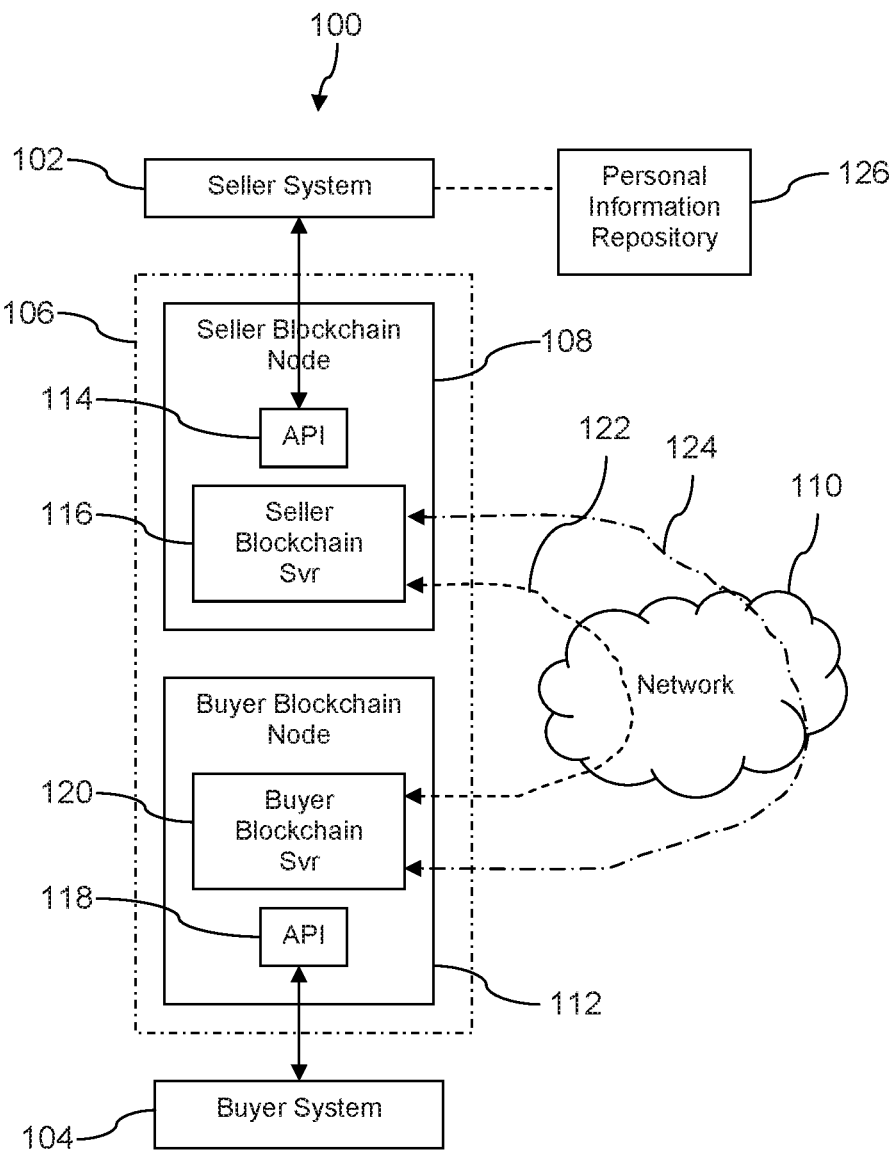
FIG. 1 is a block diagram of a system for matching a buyer to a seller according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

In traditional lending processes, a consumer or agent can apply for a loan at a lender, merchant, lead aggregator, or the like, which can be referred to in some contexts as a loan originator (e.g., a platform that receives a customer looking for a loan). In this process, the customer can provide various credit and personal information to the loan originator as part of the loan process. The loan originator can be partnered with one or more lenders that can provide the loan across the credit spectrum (e.g., credit associated with different amounts of money, credit for different consumer products, credit for customers having different credit ratings or credit scores). Since most lenders do not accept credit scores across the spectrum, most loan originators partner with multiple lenders with different approval criteria to provide loans to a greater percentage of the loan originator's customers.

The loan originator can sell the leads (e.g., the opportunities to extend credit to customers) in order to obtain revenue (e.g., based on sales closed through financing of a purchase for a merchant model, as an example). For example, a payment model such as a fixed price per lead model, price per funded loan model, a price per approval model, and the like can be used between a loan originator such as a merchant and a lender. Upon reviewing the leads, the lender may approve a portion of the leads for loans. Often the portion approved under this model can be relatively low, such as up to about 20% to 25%. The leads that are rejected typically are associated with customers having poor credit scores or otherwise deemed to be poor credit risks. As a result, the rejected leads often cannot be resold as they would likely fail the approval criteria of other lenders as well. Thus, these leads that are purchased are considered a sunk cost for the lenders, and the low acceptance rate increases the cost of acquiring loans for the lenders. In the event that a customer is rejected by all of the lenders, the customer may experience a poor customer experience at the loan originator, which can result in lost revenue for the loan originator.

The traditional loan approval process generally begins with the loan originator sequentially checking the leads against each lender's approval criteria. As an example, the lead can be sent to a first lender for consideration. The lead can include the loan information (e.g., financing amount, identity of the consumer product, price of the consumer product, name of the loan originator selling the product) as well as personal information about the customer (e.g., customer name, customer phone number, customer residential address, customer employer), which can be referred to as lead information. In general, a credit report is pulled for the customer as part of the loan approval process. The credit report can be pulled by the first lender, which can use the credit report information along with the lead information to compare with the first lender's approval criteria. If the first lender approves the loan, then an approval can be returned to the loan originator and the loan can be processed for the customer. However, if the first lender rejects the lead, then the process begins again with a second lender. For example, the lead information can be sent to the second lender for use in the loan approval process. The second lender can pull the credit report on the customer. The second lender can then either approve or reject the loan. If the loan is rejected, this process can continue until all of the lenders are exhausted or a lender approves the loan.

This type of sequential approval process can result in multiple credit reports being pulled for each customer when the customer is rejected. The customer's credit score can be hurt if more than a certain number of credit reports are pulled within a given time period. Loan originators are also generally required to obtain permission to share the customer's personal information (e.g., personally identifiable information—PII), such as their credit information. When the loan is sent to multiple lenders, this process can be tedious and time consuming. Further, the customer's PII can be shared between multiple parties including the loan originator and each lender considering the loan. This increases the likelihood that the customer's PII can be stolen or inadvertently disclosed, which in turn can expose the customer to identity theft and promote cybercrime.

Disclosed herein is a secure and decentralized marketplace and system for obtaining approvals for loans for customers. In the disclosed system, nodes can be established at the lender and at the loan originator. The lender's approval models can be loaded in byte code format into the loan originator's node, thereby shielding the details of the lender's model from the loan originator. As used herein, byte code refers to machine code that is modified from the original source code format such that the code cannot be reversed back into source code and cannot generally be understood or deciphered by a human. The use of byte code allows the lender's model and parameters within the approval model to be shielded from the loan originator (e.g., a merchant or seller). The system further retains customer PII of the customer on the loan originator server while the customer lead is analyzed according to one or more models, thereby enabling security for the customer. Within the loan originator's database of models, a number of different lenders can provide approval models, thereby enabling the loan originator to check more than one lender's products at a time, with the models run using the customer PII in parallel on the loan originator's node. This allows for multiple approval models and lenders to be accessed for each set of customer data. In this system, a customer's information can be used with a plurality of lender models and products, thereby providing the best product for the customer without exposing the customer information outside of the loan originator systems. This system avoids the customer having a poor customer experience while navigating across different lender platforms and/or being declined before ending up with final offer for a lending product. This system further allows pulling credit information from a third party credit scoring bureau only once while analyzing the customer lead against a plurality of lender models, thereby avoiding damaging the customer's credit score. Still further, the present system avoids a customer accepting a sub-optimal product offering based on the first approval received in a serial application process, and rather allows for the best option or options to be presented to the customer based on the plurality of lender approval models that are executed for the customer.

The system can be implemented in part based on using a private blockchain with the blockchain nodes located at the loan originator site and at each lender site. Each of the transactions such as the approval model upload, PII push, lead evaluation, and the like can occur on the private blockchain, thereby ensuring an additional layer of security for both the customer PII as well as the lender approval model(s). Having a blockchain node at the lender allows the lenders to update, change, remove, or add additional approval models that can be sent to the loan originator blockchain node in bytecode format. This allows the loan originator to access the new lending models as soon as they are updated, while retaining the models as proprietary to the lender (e.g., the lender retains the human readable source code of its model and propagates a byte code version of its model to the loan originator node).

Unlike a third party system, the information is retained at the lender and merchant, thereby avoiding the potential of a third party platform from having access to customer PII or the lenders' approval models, thereby avoiding the possibility that the third party platform can be hacked to undesirably access the information. Rather, the present system prevents the third party intermediate from ever having access to the customer PII, credit report, or lenders' approval models. The present system can also use and rely on a private cryptocurrency that allows for an escrow account to be used to transfer money or credit for the lead once approved.

The present system then presents a number of advantages over other third party systems. For the loan originator, the system allows multiple lenders to be evaluated in parallel, thereby allowing for a faster and more complete evaluation of the lending options. The loan originator can then provide higher quality leads to the lenders while providing one or more options to the customers.

For the customer, a single application for credit can be used to find a lending product across multiple lenders, which is more convenient and hassle free for them. The present systems and methods also help to protect the customer data (e.g., PII) against a breach by retaining the information on the loan originator's system until a lending product is selected. This limits the disclosure of the PII to the one lender offering the product selected. This system also requests a credit report from a third party credit bureau by the loan originator one time, and this one credit report is then used across all of the lender models. This is distinct from a system that passes the PII to a third party or the lender where each validation requires a separate credit report pull, which can result in a decrease in the credit score of the customer.

For a lender to participate in the system, the lender simply transmits its approval model(s) to the loan originator in byte code format. Once the approval model(s) have been provided to the system, the lender receives only leads for customers that are pre-qualified based on the approval models from the system. The lender then may process the pre-qualified lead accordingly. Further, at the point at which the lender receives the lead, the customer has selected the approved lending product. This can save a significant amount of processing cost to the lender by reducing the overall lead rejection rate. In the event that a customer is rejected after the initial approval, the lead can be resold to another lender as the lead originates as a high quality lead. From the customer viewpoint, any such resale is seamless and improves the likelihood of a customer conversion.

While described in the context of loan originators and lenders, the present systems can also be used in other systems that utilize personal information of a customer with a model or validation criteria such that the personal information can be protected while also allowing certain seller criteria to remain unavailable to the buyer. For example health insurance markets or health care information exchanges can also use the systems and methods described herein to validate patient information across multiple health care providers and/or insurance companies while not sharing any personal information until a provider or health insurance plan is selected by the patient. This type of system can then help with maintaining compliance with the various regulations involving patient and healthcare information.

In an embodiment, the system can further provide point-of-need (PON) credit and/or financing to customers. The customer can be pre-evaluated automatically based on a variety of data associated with the customer, and a plurality of loan approvals can be generated via evaluation of lender approval models, before the customer seeks financing for a specific product. One of the loan approvals can be automatically selected based on a selection rule set. The selected loan approval can be presented to the customer through any of a plurality of different channels. The customer may then claim the presented loan by signing (e.g., digitally signing, etc.) the lender's contract. At this point, funds would be indicated as being available to the customer. Because the customer knows what credit is available to him or her at the merchant, they can scale their purchase activity accordingly. For example, they may buy a more upscale sofa. Alternatively, they may determine that they can buy both a sofa and a recliner chair. The customer can claim the credit offer with a single click on a presentation screen on their mobile phone or their computer. In this system, the customer is spared the embarrassment and hassle of a loan decline experience.

This system can provide optimized credit offers for the customer, for example based on selecting the best among several loan approvals. This system can provide optimized product selling, from the perspective of the merchant, by optimizing the credit offers at least in part to prefer lenders based on rules and/or those who have established a good business relationship with the merchant over time. The optimization of the credit offers can be managed by defining and refining the selection rule set over time, based on tracking and analyzing loan histories of consumers and lenders. For example, the selection rule set can be refined based on analysis of a history of take rates and/or analysis of a history of customer loan acceptance. Thus, a credit broker rule set builder may execute on a server computer and access anonymized data about customers, products sold, loans offered, and payments completed. Anonymizing the data about the customers may avoid inadvertent compromise and release of customer PII.

This system helps the merchant to maintain trust with the customer. By knowing how much loan credit is available to the customer, the merchant may be better able to up-sell and to cross-sell products to the customer. The system allows the merchant to work with multiple different lenders all within its own firewall. The system also allows the lenders to work with a single integration platform without disclosing their proprietary logic or approval models to other lenders, product providers, or merchants.

Figure 2:
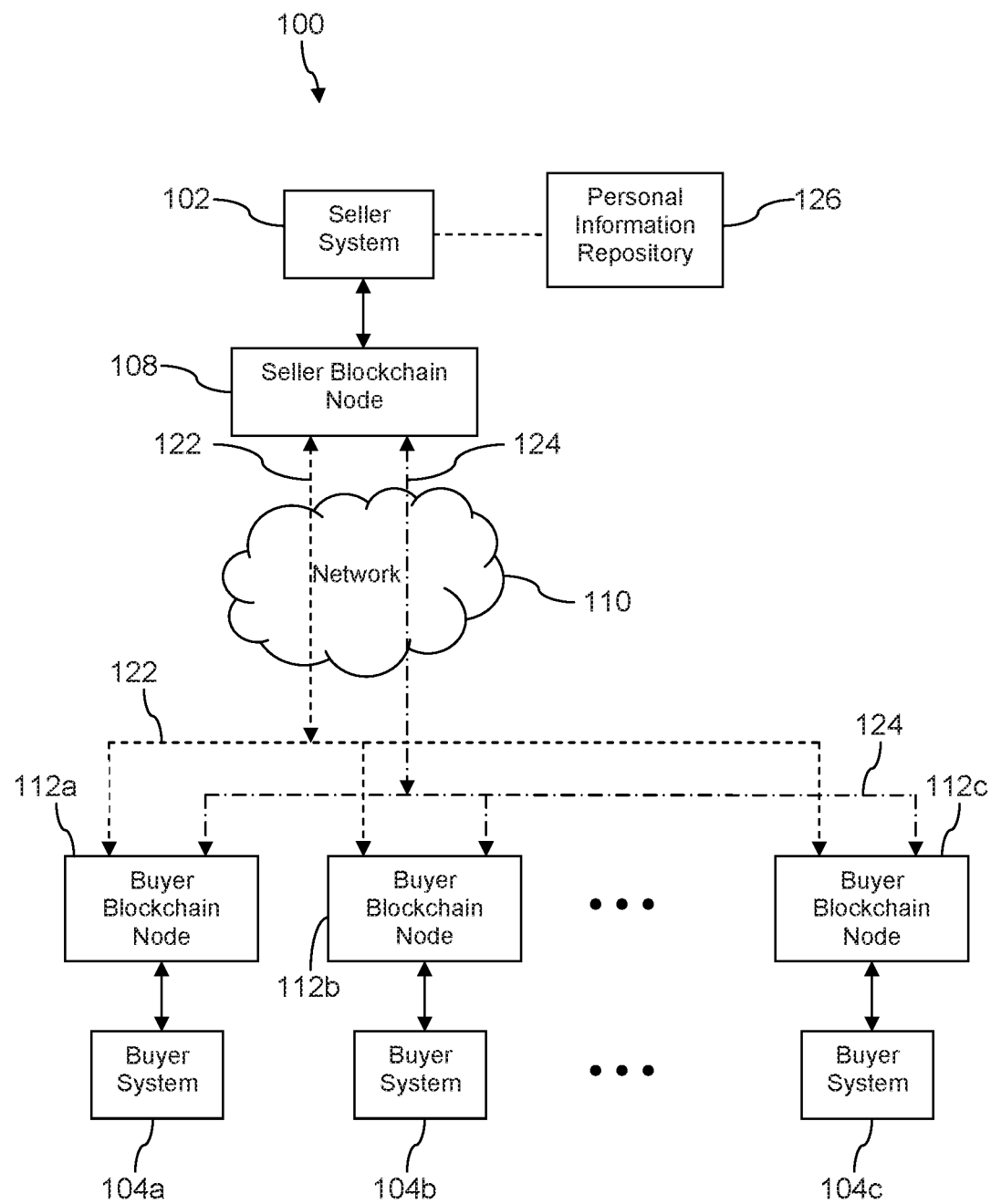
FIG. 2 is a block diagram of another aspect of the system for matching a buyer to a seller according to an embodiment of the disclosure.

Turning now to FIG. 1, a secure matching system 100 is described. In an embodiment, the system 100 comprises a seller system 102 and a buyer system 104. The seller system 102 and the buyer system 104 communicate with each other to match a buyer to a seller to provide a product or service, for example a loan to an end customer. The communication between the seller system 102 and the buyer system 104 during the processing of matching the buyer to the seller (versus during a subsequent process of completing a transfer of loaned funds) is conducted through a blockchain system 106 (e.g., exclusively through the blockchain system 106), whereby the benefits of protecting customer personally identifiable information (PII) and protecting the details of a lending model of the buyer systems 104 are provided. In FIG. 2 the system 100 is shown with a plurality of buyer systems 104, and the behavior of the system 100 where a plurality of buyer systems 104 are present is described hereinafter.

The blockchain system 106 comprises a seller blockchain node 108 and a buyer blockchain node 112 that communicate with each other via a network 110. The network 110 may comprise one or more private networks, one or more public networks, or a combination thereof. In an embodiment, the seller blockchain node 108 comprises a seller application programming interface (API) 114 and a seller blockchain server 116. It is understood that the seller blockchain node 108 can be located at a site that may be controlled by the seller, where the seller is able to assure physical security for the seller blockchain node 108 (e.g., restrict a buyer, as well as others, from accessing the seller blockchain node 108). In an embodiment, the buyer blockchain node 112 comprises a buyer API 118 and a buyer blockchain server 120. It is understood that the buyer blockchain node 112 can be located at a site that may be controlled by the buyer, where the buyer is able to assure physical security for the buyer blockchain node 112 (e.g., restrict a seller or another buyer, and others, from accessing the buyer blockchain node 112).

The seller blockchain node 108 and the buyer blockchain node 112 conduct both private communications and public communications with each other via the network 110. The blockchain communications (e.g., private blockchain communications and/or public blockchain communications) may be conducted over a private blockchain communication channel 122, and the public communications may be conducted over a public communication channel 124. Some of the private communications conducted over the private blockchain communication channel 122 comprise what may be referred to as private transactions, and some of the public communications conducted over the public communication channel 124 comprise what may be referred to as public transactions. In addition to private blockchain communications over the private blockchain communication channel 122, public communications between the blockchain nodes can also occur over the private blockchain communication channel 122. Since the public communications occurring over the private blockchain communication channel 122 can be limited to the blockchain nodes on the blockchain network, additional communications between components of the blockchain nodes (e.g., the API, other programs operating outside of the blockchain server, etc.) can rely on communications over the public communication channel 124 for various purposes, as described in more detail herein. The public transactions occurring over the public communication channel 124 can comprise information and files that are public and non-sensitive or non-secret in some embodiments. This non-private information can include information about the products and services, and/or transaction protocols or formats for the various blockchain transactions.

In an embodiment, the blockchain servers 116, 120 can be implemented as Quorum blockchain servers, and the private blockchain communication channel 122 can be implemented as a Quorum communication channel. In an embodiment, the public communication channel 124 can be implemented as an interplanetary file system (IPFS) communication channel. In other embodiments, however, the private blockchain communication channel 122 and/or the public communication channel 124 may be implemented with different technologies.

In operation, the buyer may build a purchase, credit, or approval model (referred to herein as an approval model) on the buyer system 104, for example code defining executable model logic and defining data values that collectively constitute the approval model. The buyer may store its approval model in the buyer system 104 in source code format (e.g., in a human readable format such as in a programming language or in a scripting language). The buyer may process the model source code with a software tool (e.g., a compiler and/or software development kit—SDK) to create a computer executable artifact such as an executable file of byte code or a plurality of executable files of byte code. The approval model may be referred to in some contexts as a lending model or a credit evaluation model.

The buyer system 104 may execute a method of the buyer API 118 to provide the buyer's approval model in byte code format to the buyer blockchain node 112, and the buyer blockchain server 120 may provide the byte code to the seller blockchain server 116 via the network 110, for example via the public communication channel 124 or the private blockchain communication channel 122, as described in more detail herein. Alternatively, in an embodiment, the buyer system 104 may execute a method of the buyer API 118 to provide the buyer's approval model in source code format to the buyer blockchain node 112, the buyer's blockchain node 112 may process the source code to generate the approval model in byte code format, and the buyer's blockchain server 120 may provide the buyer's approval model in byte code format to the seller blockchain server 116 via the network 110, for example via the public communication channel 124 or the private blockchain communication channel 122.

Note that the human readable source code form of the buyer's approval model is never present in the seller blockchain node 108, thereby maintaining the content and logic of the buyer's approval model confidential and hidden from the seller. The seller blockchain node 108 may store the byte code in a private partition of memory or storage. In an embodiment, the buyer may create different approval models and different corresponding approval model byte codes pertaining to different lending products that the buyer may offer. For example, a first approval model of the buyer may be associated with a first down payment percentage and a first interest rate associated with a first range of customer credit worthiness (e.g., a first range of credit score) and a second approval model of the same buyer may be associated with a second down payment percentage and a second interest rate associated with a second range of customer credit worthiness. In some embodiments, the buyer may create a plurality of approval models and transmit a plurality of approval model byte code packages to the seller blockchain node 108. In some embodiments, the approval model can contain model byte code for a plurality of lending products in a single byte code model.

When the seller system 102 has a lead (e.g., a customer or prospect who may wish to obtain credit), the seller system 102 can provide customer information to the seller API 114. The personal information repository 126 can be a data store that provides additional information about a customer such as account information, address, etc. The personal information repository 126 can include any source of personal information (e.g., PII data, mobile device data, internet of things (IOT) data, user input information, etc.) obtained from various sources such as customer accounts at the seller, customer accounts at partner vendors, sellers, or merchants, profiles on social media, publicly available information, or the like. Using the personal information repository 126, the system can obtain the information necessary to provide to an approval model for approval of the customer. The resulting personal information repository 126 can represent a proprietary consumer database that is not shared with the buyer unless and until a customer accepts an approved product, and then only the information necessary to accept the approved product needs to be sent to the buyer platform. The remaining information can then remain protected and proprietary to the seller. This allows the customer to maintain trust with the seller.

The seller system 102 may pull a customer credit report from a credit bureau and/or information store using information from a personal information repository 126. The credit report can be pulled from the personal information repository 126, or separately pulled by the seller system 102 and/or the seller blockchain node 108. In some embodiments, the seller API 114 can generate the request and pull the customer credit report from a personal information repository 126 as an alternative to the seller system 102 and/or when the seller system 102 has not already pulled a credit report. While in FIG. 1 the seller system 102 is illustrated as directly linked via a dotted line to the personal information repository 126, in an embodiment the seller system 102 may communicate with the personal information repository 126 via the network 110. The seller system 102 may provide identifying information about the customer to the personal information repository 126 such as customer name, customer residential address, customer work address, customer social security number, customer phone number, customer driver's license number, customer date-of-birth, or other identifying information. In an embodiment, a seller system 102 may provide a first name, a middle initial, a last name, a street address, a city, a state, a zip code, and/or a social security number of the customer. The personal data repository 126 (e.g., a credit bureau, account store, etc.) may access information relating to a customer's credit worthiness such as outstanding indebtedness, kinds of indebtedness, debt payment history, income history, employment history, and public utility payment history. The personal information repository 126 may analyze this information to evaluate a creditworthiness of the customer and may generate a credit rating or a credit score based on the evaluation. The personal information repository 126 may provide a credit score or other information pertaining to creditworthiness of the customer to the seller system 102. The customer information that the seller system 102 provides to the seller API 114 may comprise customer identity information, customer contact information, and a credit score or other credit worthiness information.

Some or all of this customer information provided to the seller API 114 by the seller system 102 may be deemed personally identifiable information (PII) that is to be kept confidential. Government regulations and/or industry regulations may oblige the seller to protect the customer's PII and take prudent steps to prevent its inadvertent disclosure and to reduce the risk of a cyberattack accessing the customer's PII. The seller blockchain node 108 stores the PII in a private portion of memory or storage. Because the PII is retained on the seller blockchain node 108 and not propagated to the buyer blockchain node 112, the PII can be better protected by the seller.

The seller blockchain server 116 executes the byte code provided by the buyer using the data of the customer (e.g., PII data, mobile data, user input information, internet of things (IOT) data, etc.) as input. In some contexts this may be referred to as executing the approval model of the buyer using the PII of the customer as input. The result of executing the approval model of the buyer is an accept response or a reject response (e.g., the buyer accepts the lead and indicates it is willing to extend credit to the customer associated with the lead or the buyer rejects the lead and indicates it is not willing to extend credit to the customer). The accept response provided to the seller may identify one or more lending products and may include corresponding loan details such as a period over which the loan offer is valid, a loan amount, a payback period, an interest rate, a monthly payment amount, a minimum loan to value ratio, and other loan-related information. If the result is an accept response, the seller may provide information to the buyer enabling the buyer to contact the customer and complete the process of extending credit to the customer. In an embodiment, a buyer's contract may be presented to a customer at the seller's webpage, enabling the closure of the customer credit acceptance in a manner convenient to the customer. This allows the eligible product or products to be available for selection by the customer across multiple platforms such as web browsers, mobile devices, apps, or even on devices that are offline on the seller systems (since the system operates on the seller systems without communicating outside of the system initially)

If the buyer has provided a plurality of approval models (e.g., as a plurality of model byte codes or a single model byte code representing a plurality of lending products), the executed model(s), as executing on the seller node, may generate more than one acceptance responses and these acceptance responses may be transmitted to the seller. The product selection logic at the seller may select a product to present to the customer, as described in more detail here. The seller then sends the customer information to the buyer with a designation of which of the plurality of approved lending products has been selected for the customer.

In an embodiment, the seller blockchain node 108 may communicate the lead (e.g., customer contact information) to the buyer blockchain node 112, and the buyer blockchain node 112 may communicate the lead to the buyer system 104. Note that ultimately some or all of the customer PII may be communicated to the buyer having the selected lending product in the event of an approval result, but the PII is not communicated to the buyer in the event of a rejection result or to a buyer whose lending product is not selected (unless that buyer had another lending product that was selected). Additionally, had the approval models of a plurality of buyers been executed (see the discussion of FIG. 2 which relates to system 100 when a plurality of buyers are present), only the buyer associated with the acceptance would receive the customer PII and the other buyers would not receive the customer PII.

This system allows the seller to verify the financing options available for a given customer prior to the customer making a purchase. This allows the seller to up-sell and cross-sell various products as part of the lending product presentation to the customer. The ability to select a lending product that matches or exceeds the customer's planned purchase amount can provide a positive experience for the customer.

Turning now to FIG. 2, further details of the system 100 are described. In the example of the system 100 illustrated in FIG. 2, the seller system 102 interworks with a plurality of different buyer systems 104, for example a first buyer system 104a, a second buyer system 104b, and a third buyer system 104c. It is understood that the system 100 may comprise any number of buyers. The first buyer system 104a is in communication with a first buyer blockchain node 112a. The second buyer system 104b is in communication with a second buyer blockchain node 112b. The third buyer system 104c is in communication with a third buyer blockchain node 112c. The operation of system 100 illustrated in FIG. 2 is substantially similar to the operation of system 100 illustrated in FIG. 1, with the provision that FIG. 2 comprises a plurality of buyers.

While shown in FIG. 2 as having a single seller system interacting with a plurality of buyer blockchain nodes, it should be noted that the system can comprise a plurality of seller blockchain nodes, each connected to one or more buyer blockchain nodes as shown in FIG. 2. Accordingly, a blockchain system according to the embodiments shown herein can comprise a plurality of seller systems, seller blockchain nodes, buyer blockchain nodes, and buyer systems in a larger interacting environment according to any of the processes as described herein.

The seller blockchain node 108, the first buyer blockchain node 112a, the second buyer blockchain node 112b, and the third buyer blockchain node 112c communicate with each other via the network 110, using the private blockchain communication channel 122 and the public communication channel 124. When the seller blockchain node 108 receives a lead from the seller system 102, the seller blockchain node 108 executes one or more approval model byte code packages associated with the first buyer system 104a, executes one or more approval model byte code packages associated with the second buyer system 104b, and executes one or more approval model byte code packages associated with the third buyer system 104c. The seller blockchain node 108 notifies the seller system 102 of any accept responses produced by the approval model byte code packages. The accept response provided to the seller system 102 may identify one or more lending products and may include loan details such as a period over which the loan offer is valid, a loan amount, a payback period, an interest rate, a monthly payment amount, a minimum loan to value ratio, and other loan-related information. The product selection logic at the seller may select a product to present to the customer, as described in more detail here. The seller system 102 may then send the customer information identifying the selected loan package to the respective buyer system 104 identifying the selected loan package.

The buyer system 104 that provides the selected loan package may reach out to the customer through a variety of communication channels to complete the lending process. The buyer system 104 may provide terms and conditions of the loan to the customer. The customer may sign a contract binding him or her to honor the payback terms and other terms of the loan. The buyer system 104, when it has received the customer's contractual commitment, may provide funds to the seller system 102, for example to a loan originator (e.g., a merchant) system associated with a purchased product. In some embodiments, the buyer system 104 can provide the funds to the customer using a banking system (e.g., including a virtual card payment system, etc.), and the customer can then use the funds to purchase the product. In some embodiments, the seller can use a virtual card system as described herein to enable the customer to purchase merchandise with the available credit supplied by the loan. In an embodiment, the buyer system 104 may command the associated buyer blockchain node 112 to make payment to the seller blockchain node 108 in cryptocurrency. The settlement of the financial transactions may be resolved periodically through a system of escrow payments by the buyer systems 104.

It is noted that system 100—whether it involves a single buyer system 104 or whether it involves a plurality of buyer systems 104a, 104b, 104c—provides the benefits of confidentiality and protection of customer PII discussed above. The customer PII is maintained confidentially on the seller blockchain node 108 until a customer has accepted an approved loan product. The customer PII is then shared only with the one buyer (e.g., the buyer whose approval model generated an accept response that the customer selected). The customer PII is not shared with the other buyers, thereby reducing the exposure of the customer PII to hacking. The customer is further benefited in that the seller system 102 makes a single pull of credit worthiness information (e.g., a credit score) from the personal information repository 126, thereby avoiding damaging the customer's credit score by making a plurality of credit inquiries in a short period of time.

The system 100 also provides the confidentiality of the content of buyer models discussed above: the seller blockchain node 108 can execute the approval models of the buyers providing the customer information as input, but it cannot see the approval model source code. The buyer is able to easily update and change its approval model simply by creating the new or revised source code, processing this source code into an approval model byte code package, and pushing that purchase model byte code package to the seller blockchain node 108. In some embodiments, variables within the approval model can be updated within an existing approval model by initiating a transaction by the buyer. The transaction can be used to update information within the model such as variables, coefficients, and/or the applicability of one or more elements (e.g., by setting coefficients to zero) using a transaction request. This allows the models to be easily updated without the need to update the entire approval model while also having those changes be implemented with immediate effect. Since the seller blockchain node 108 uses whatever is the most current approval model byte code package it stores in its private storage, the buyer's changed approval model is effective immediately and seamlessly.

In some embodiments the approvals obtained from the approval model can result in a product being provided by the buyer to a customer. When a plurality of sellers are present in the system, more than one seller can be in communication with a given buyer. In this embodiment, the product provided to the seller for the customer may be in the form of a smart contract having executable code. The code provided by the buyer can in some embodiments comprise verification information for the customer. This can help to prevent the same customer from obtaining a product from the buyer across two or more sellers. As an example, a customer may obtain two approvals from the same lender from two separate sellers, by for example, applying through the two sellers at or near the same time. Since a buyer may only want to provide one product to a given customer, the first approval that is accepted by the customer can allow the buyer to log the customer into a network store of accepted products. In an embodiment, the first approval and/or the customer may be logged on the blockchain. The logged information can be included in future products to provide a rule set for verifying if the customer should obtain a second product. If a second approval is accepted by the same customer, the code within the product can perform a verification to determine if the customer has already accepted an earlier product. For example, the product can comprise a list of customers or identifications of customers that have recently accepted products. By checking the list at the time the contract (e.g., that can comprise executable code) is provided to the customer, the product can reject the customer if the list indicates that the same customer should not receive another product. This allows buyers operating on a system with a plurality of sellers to build in cross-checks and verifications in the form of rules set into the products provided for customer acceptance based on approvals from the sellers.

As noted above, the systems as described herein allow for an ecosystem of sellers and buyers to be present in a platform, wherein a plurality of sellers are available for each buyer to interact with, and a plurality of buyers are available for each seller to interact with. This system allows for trust to be developed between the sellers and buyers based on the security provided by the private blockchain network. In some embodiments, the sellers and/or buyers can be screened prior to being allowed to join the platform. For example, the credit broker system can perform a series of verifications of a seller prior to allowing the seller to have a blockchain node and/or registering the seller's blockchain node on the system so that it is discoverable and/or available for interactions with any buyer blockchain nodes. The verifications can include information such as a credit history verification (e.g., using a credit report for the seller, legal name, type of business, revenue verification, sales volumes, etc.) to ensure that the merchant is financially stable. Other suitable verifications such as operating history to verify sales volumes and company stability can also be used. These types of credit and operating worthiness allow for a quality rating and/or credibility to be determined, which can be used as a basis for accepting or rejecting a seller within the system.

Based on the results of the verification, the seller can be allowed on the blockchain network. Each buyer and seller can then engage in individual agreements or arrangements for the approval process (e.g., exchange of approval models, etc.), escrows, and the like. The verification allows for the buyers to establish escrow accounts for the loan amounts with the sellers, as described in more detail herein, while having confidence that such escrow amounts are not at risk. As part of the establishment of a relationship between the seller and buyer, the buyers can provide the approval models to the sellers on a short term or trial basis. For example, the approval model can have executable code that can deactivate the approval model after a specific time period (e.g., a day, a week, a month, etc.). During this time, the seller can operate the buyer approval model to provide data to the buyer without receiving any specific approvals. After a trial period, the seller and buyer can enter a formal arrangement based on the information obtained during the trial period. This allows the buyer to verify the sales volumes, systems, and interactions with the seller in the privacy of the blockchain network. As an overall ecosystem, the private blockchain network then allows a plurality of buyer and a plurality of sellers to interact and conduct business with the ability to have trust in the other party based on the initial verifications and/or trial periods.

Figure 3:
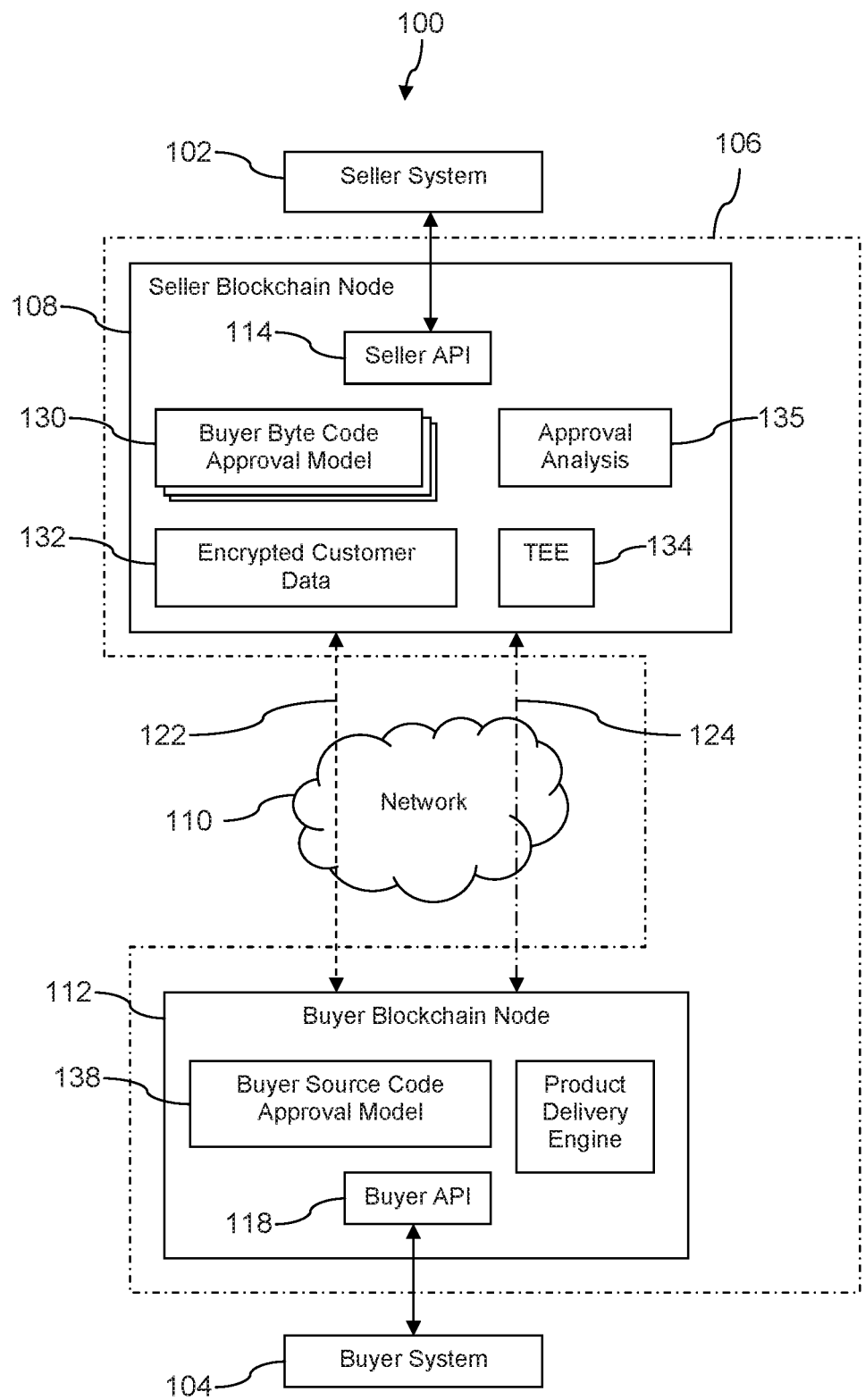
FIG. 3 is a block diagram of yet another aspect of the system for matching a buyer to a seller according to an embodiment of the disclosure.

Turning now to FIG. 3, further details of the blockchain nodes 108, 112 are described. The blockchain nodes 108, 112 can be used in the systems described with respect to FIGS. 1 and 2. In some embodiments, the seller blockchain node 108 stores at least one buyer byte code approval model 130. When the seller system 102 provides customer information associated with a customer lead, a trusted execution environment (TEE) 134 of the seller blockchain node 108 encrypts the customer information and stores it as encrypted customer data 132 in the private memory of the seller blockchain node 108. An approval analysis component 135 executes one or more of the buyer byte code approval models 130 in parallel, providing encrypted customer data 132 to the models 130 as input. The approval analysis component 135 receives responses from execution of the buyer byte code approval models 130 and returns the accept responses via the seller API 114 to the seller system 102 with appropriate buyer contact information and identities of specific product packages (e.g., specific loan packages) that are associated with approve responses. While the approval analysis component 135 may receive rejection responses from execution of the buyer byte code approval models 130, these rejections are not sent to the seller system 102. Alternatively, in an embodiment, rejection responses are also provided by the approval analysis component 135 via the seller API 114 to the seller system 102.

In an embodiment, the buyer blockchain node 112 stores one or more buyer source code approval models 138 in a private portion of memory of the buyer blockchain node 112. The buyer blockchain node 112 may then process the buyer source code approval models 138 to produce corresponding approval model byte code packages that are then sent to the seller blockchain node 108 via the private blockchain communication channel 122. The seller blockchain node 108 stores the approval model byte code packages in a private portion of memory of the seller blockchain node 108. Alternatively, the buyer system 104 stores one or more buyer source code approval models 138 in the buyer system 104 and provides only approval model byte code packages (e.g., one byte code package or file per different approval model, one byte code package or file per multiple different approval models, etc.) to the buyer blockchain node 112 for storing in the private portion of memory and for transmitting via the private blockchain communication channel 122 to the seller blockchain node 108. It is noted that when the approval analysis component 135 of the seller blockchain node 108 executes buyer byte code approval models 130, the buyer blockchain node 112 is not inherently engaged or informed. The evaluation is conducted on the basis of the approval model byte code package(s) previously provided by the buyer blockchain node 112.

When the seller system 102 has received one or more acceptance responses from the seller API 114, the seller system 102 may present the one or more purchase offers to a customer of the seller. For example, the seller may present the customer with a plurality of loan offerings with their associated terms and conditions. The customer may select one of the purchase offers. The seller system 102 may then pass customer information (e.g., PII) to the buyer system 104 through the network 110 via a different communication mechanism than either the private blockchain communication channel 122 or the public communication channel 124 between the blockchain nodes 108, 112. The buyer may perform some further analysis of the customer and/or the loan offer selected by the customer.

At this point the buyer may reject or accept the proposition of lending the customer money. In some embodiments, the buyer may accept the loan based on the acceptance response from the byte code model. It is noted, however, that even if the buyer rejects the lending opportunity, the analysis and ultimate rejection occurred in the context of a pre-screened, pre-approved loan recipient. It would be expected that the loan approval rate for such pre-screened loan recipients would be much higher than without relying on the system 100 for pre-screening, pre-evaluating loan recipients based on the buyer approval models. Such a rejected lead could then be sold to other buyers with a higher conversion rate.

Figure 4:
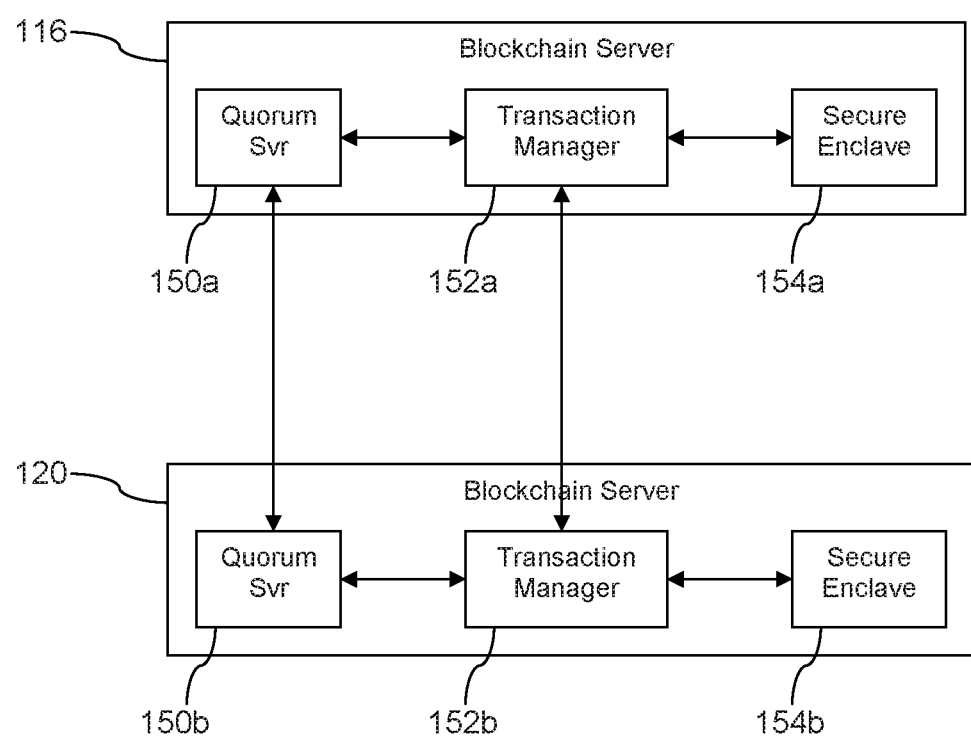
FIG. 4 is a schematic representation of blockchain servers according to an embodiment.

Turning now to FIG. 4, further details about the blockchain servers 116, 120 are described. The blockchain servers 116, 120 can be used in any of the embodiments described with respect to FIGS. 1-3. In an embodiment, at least some of the secure matching system 100 is implemented using a Quorum distributed ledger protocol and uses private transactions to transmit information to targeted blockchain nodes. In an embodiment, the seller blockchain server 116 comprises a first Quorum server 150a, a first transaction manager 152a, and a first secure enclave 154a. In an embodiment, the buyer blockchain server 120 comprises a second Quorum server 150b, a second transaction manager 152b, and a second secure enclave 154b. In an embodiment, the first secure enclave 154a is substantially similar to the trusted execution environment 134 described above with reference to FIG. 3. The first transaction manager 152a can communicate with the second transaction manager 152b, and the first Quorum server 150a can communicate with the second Quorum server 150b.

When a private transaction is sent from the seller blockchain server 116 to the buyer blockchain server 120, the first Quorum server 150a sends the transaction to the first transaction manager 152a. The first transaction manager passes the private transaction to the first secure enclave 154a. The first secure enclave generates a symmetric key, encrypts the private transaction, determines a hash of the transaction, and encrypts the symmetric key with the public key of the recipient of the private transaction (in this case, the buyer blockchain server 120). The first secure enclave then returns the encrypted transaction, the hash of the transaction, and the encrypted symmetric key. The first transaction manager 152a sends the encrypted transaction, the hash of the transaction, and the encrypted symmetric key to the second transaction manager 152b. The second transaction manager 152b stores the encrypted transaction and the encrypted symmetric key in a private memory area indexed by the hash.

The first Quorum server 150a then sends a public transaction out to other Quorum servers 150 in the private blockchain system 106 that contains the hash of the encrypted transaction. Each receiving Quorum server 150 requests its associated transaction manager 152 to look up and decrypt the transaction associated with the hash. Only the second transaction manager 152b of the blockchain server 116, 120 designated as the recipient of the private transaction has an entry that is indexed by the hash. The transaction managers 152 of other blockchain servers return a message of "transaction not found" to their Quorum server, and the attempt to execute the private transaction is abandoned by those Quorum servers.

In this example, the second transaction manager 152b of the buyer blockchain server 120 does store an entry that is indexed by the hash. The second transaction manager 152b retrieves the indexed encrypted transaction and encrypted symmetric key and sends these to the second secure enclave 154b. The second secure enclave 154b decrypts the encrypted symmetric key with its own private key, uses this symmetric key to decrypt the encrypted transaction, and returns the decrypted transaction to the second transaction manager 152b. The second transaction manager 152b returns the decrypted transaction to the second Quorum server 150b. The second Quorum server 150b executes the decrypted transaction. Like procedures can be implemented for private transactions directed to two or more blockchain servers.

Figure 5:
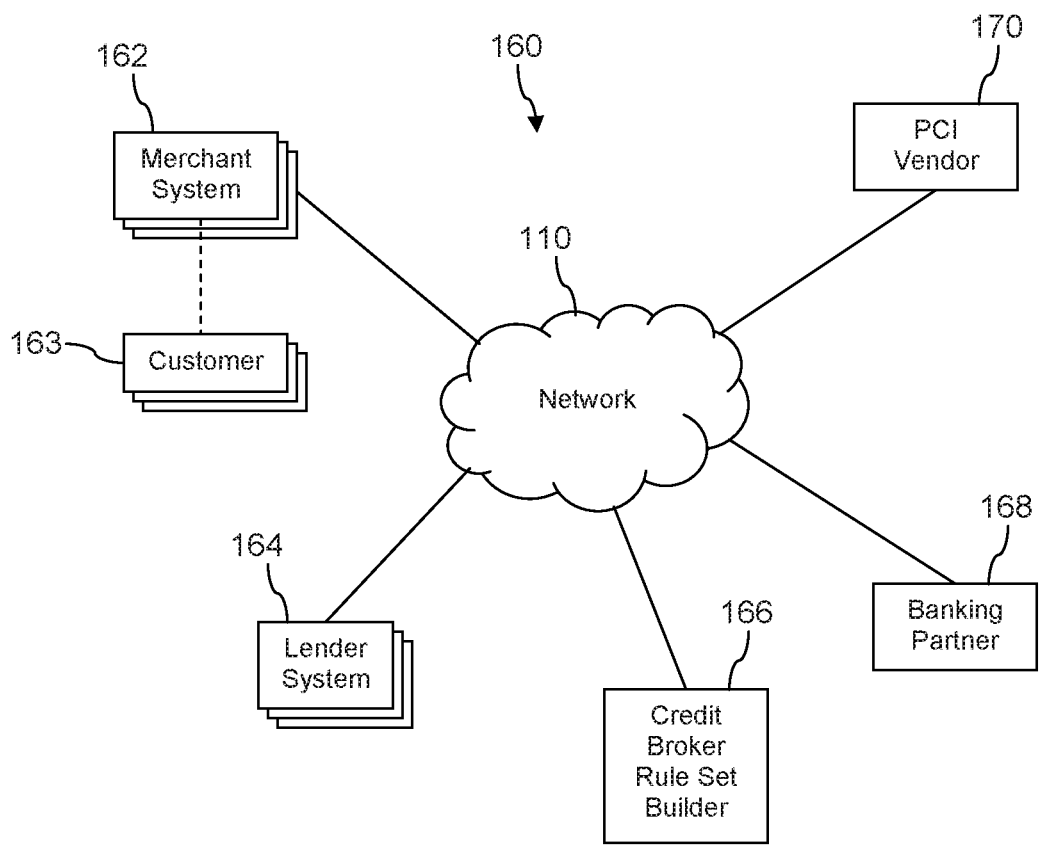
FIG. 5 is a block diagram of a system according to an embodiment of the disclosure.

Turning now to FIG. 5, a system 160 for mediating loans to customers is described. In an embodiment, the system 160 comprises one or more merchant systems 162, a plurality of lender systems 164, a credit broker rule set builder 166, a banking partner 168, a payment card industry (PCI) vendor 170, and the network 110. Each of the merchant systems 162 may interact with one or more customers 163. For example, a merchant system 162 may maintain relationships with one or more customers 163. For example, the merchant system 162 may provide a customer loyalty program that customers 163 may enroll in. For example, the merchant system 162 may provide accounts for customers 163.

The merchant system 162 may communicate with the customer 163 in any of a variety of different communication channels including email, web interface, text messages, voice messages, or other communication channels. The merchant 162 may communicate with the customer 163 in-store via an automated kiosk. While the link between the customers 163 and the merchants 162 is shown as a direct dotted line link in FIG. 5, it is understood the communication path between the merchants 162 and the customers 163 may, in part, be via the network 110. The customer 163 of FIG. 5 may be considered to be a communication device used by the customer or alternatively the living customer himself or herself.

In an embodiment, the merchant system 162 may comprise the seller system 102 and the seller blockchain node 108 described above. In an embodiment, the lender system 164 may comprise the buyer system 104 and the buyer blockchain node 112 described above. The merchant system 162 can execute the buyer byte code approval models 130 associated with lender system 164 to generate one or more loan approvals, as described further above. In an embodiment, the loan approvals are generated without contacting lenders associated with the approval models. The merchant system 162 can generate these loan approvals before the customer 163 enters a merchant store or shops on-line via a merchant e-commerce web site.

In an embodiment, before the merchant system 162 executes the buyer byte code approval models 130, the merchant system 162 may perform fraud checks and know-your-customer (KYC) checks on the customer 163. Part of this validation of the customer 163 may comprise accessing customer information, such as credit score, credit rating from the personal information repository 126 and/or from a credit bureau service. This validation of the customer 163 may take place at regular time intervals, for example once per month. Additionally, this validation of the customer 163 may take place in response to an event trigger, for example the event trigger of repeating the evaluation of lender approval models pursuant to offering loan credit to the customer 163, for example on the event of the customer 163 exhausting a credit offering or on the event of a credit offering expiring. If the customer 163 does not pass fraud checks or KYC checks, the merchant system 162 may not advance to executing lender approval models for this customer 163.

The merchant system 162, for example a credit broker application executing on the seller blockchain node 108, can select one of the plurality of loan approvals based on executing a credit broker rule set. A credit broker rule set defines one or more rules for evaluating a plurality of loan approvals and selecting one loan approval for presenting to the customer 163. A rule may examine at least one of a history of customer loan acceptances for the lenders associated with the loan approvals, a ranking of the lenders associated with the loan approvals, and a ranking of terms of the loans. The merchant system 162 can then present the terms of the selected loan to the customer 163, for example on his or her mobile phone, on his or her computer, or on an in-store kiosk. The customer 163 can accept the loan and have money transferred by making a single click.

Figure 6:
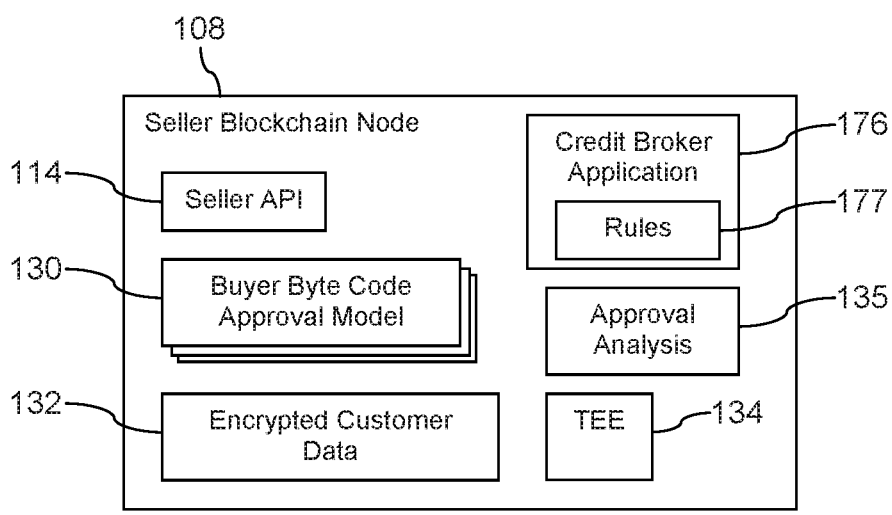
FIG. 6 is a block diagram of a seller blockchain node according to an embodiment of the disclosure.

Turning now to FIG. 6, further details of the seller blockchain node 108 of the merchant system 162 are described. The seller blockchain node 108 further comprises a credit broker application 176 that selects one of the plurality of loan approvals based on executing a credit broker rules set 177. In an embodiment, the credit broker application 176 obtains personal information on the customer, evaluates a plurality of loan approval responses associated with the customer that are output by executing the credit models, where the evaluation is conducted based on the credit broker rule set 177. The credit broker application 176 selects one of the loan approvals based on the evaluating and presents information to the customer 163 about the selected loan approval. For example, the credit broker application 176 presents information comprising the maximum loan amount and the loan validity time period of the selected loan approval. It is noted that the credit broker application 176 and the system 160, generally, enables making credit available to the customer 163 before the customer presents goods to be purchased at a point-of-sale (POS) station, for example at a POS station in a store of the merchant. The information may be presented via a mobile application (e.g., via a notification in the application), via email, via a web site, via a text message (e.g., SMS message or MMS message). The information may be presented via a kiosk, for example a kiosk located in a store of the merchant.

The information presented may comprise a contract for loan making and loan payback. The presentation of the contract may provide an input selection for the customer 163 to accept the terms of the contract and to commit himself or herself to the satisfaction of the contract terms.

The credit broker rules set 177 may be configured into the seller blockchain node 108 by the credit broker rule set builder 166. The merchant systems 162 may provide data to the credit broker rule set builder 166 about both previous selections of loan approvals by the credit broker applications 176 and acceptance of selected loan approvals by the customers 163. This historical data may be anonymized to eliminate PII from the historical data. Said in other words, information that links specific customers 163 by personal name, by postal address, by social security number, by telephone number can be expunged from the historical data before it is sent to the credit broker rule set builder 166, whereby to protect the PII of the customers 163 and additionally to relieve the credit broker rule set builder 166 of the burden of complying with regulations for protecting the PII. The historical data may associate an anonymous yet unique identity to data associated with the same customer. For example, historical data associated with customer John Smith may be given an anonymized yet unique identity of customer 1,527, where 1,527 may be an arbitrarily selected integer or the next integer in sequence.

The merchant system 162 and the seller blockchain node 108 may be located at a location of the merchant, for example a physical premises of the merchant such as a store. In an embodiment, the seller blockchain node 108 may be provided as cloud based infrastructure such as Amazon Web Services (AWS). When the seller blockchain node 108 is hosted in a cloud based infrastructure, security measures can be implemented to retain access control to the information and system limited to the seller, thereby protecting information of the seller even when the blockchain node is operated off of the seller's premises. The merchant is able to provide physical security for the merchant system 162 and/or the seller blockchain node 108, thereby preventing unauthorized access to the merchant system 162, to the seller blockchain node 108, to the byte code approval models 130, or to the credit broker rules set 177. The merchant system 162 does not provide customer information to lenders who are not associated with the selected one of the loan approvals.

The credit broker rule set builder 166 may periodically process the historical data of selections of loan approvals and customer responses to the selected loan approval to adapt the credit broker rules set 177 to optimize selection of loan approvals. The processing can analyze a variety of data including how often customers accept the offered selected loan approval, how much of the offered loan amount or credit amount the customer actually uses before the loan period expires, how well the merchant system 162 interworks with the lender system 164 associated with the selected loan approvals, and other historical information related to the use of approved credit. The processing can analyze the historical data in the context of the rules sets 177. A rule in the rules set 177 may examine at least one of a history of customer loan acceptances for the lenders associated with the loan approvals, a ranking of the lenders associated with the loan approvals, and a ranking of terms of the loans. The lenders may be ranked from 1 to X numerically in order of one or more attributes of their interaction with the merchant, for example a good business relationship, timely response in business interactions, or other. The terms of the loans may be ranked from 1 to Y numerically based on the cost to the customer 163 of borrowing and paying back credit.

In an embodiment, the credit broker rule set builder 166 may deliberately provide a rule set 177 to a merchant system 162 that is different from the optimized rule set 177 in order to test alternative rule configurations or to generate a richer set of historical data by which to better determine an optimal rule set 177. Consequently, in an embodiment, some of the merchant systems 162 may store rule sets 177 that have different rules for selecting loan approvals for presenting to the customers 163. In an embodiment, different rule sets 177 may be applied for selecting loan approvals for different categories of customers 163. For example, in an embodiment, customers 163 may be partitioned into four different customer categories based on demographic data, and the rules set 177 associated with the customer category to which the customer 163 belongs may be used to select a loan approval for presenting to that customer 163.

With reference again to FIG. 5, in an embodiment, the merchant system 162 may notify a banking partner 168 associated with the accepted loan. The banking partner 168 may coordinate with a PCI vendor 170 to establish a virtual credit card for the customer 163 that has a credit limit in the amount of the loan accepted by the customer 163. Alternatively, if the customer 163 is already provided with a virtual credit card associated to the merchant system 162, the credit limit in the amount of the loan accepted may be set for the virtual credit card. When the customer 163 pays for one or more products at the point-of-sale (POS) terminal of the merchant system 162, the POS can transfer payment from the virtual credit card.

The customer 163 may be able to make a series of purchases at different times from the same virtual credit card from the same accepted loan. For example, if the virtual credit card is given a credit limit of $5000, the customer 163 may make a $3000 purchase on a first date using the virtual credit card, make a $1500 purchase five days later using the virtual credit card, and make a $300 purchase three days later. After a predefined period of time, for example, after one month, the credit limit on the virtual credit card may be reduced to zero, notwithstanding any remaining credit balance on the card. At that time, the lender system 164 that funded the accepted loan may inform the customer 163 of a payment plan for paying back the credit that the customer 163 actually used. If the merchant system 162 repeats this process at a later time, the customer 163 may be offered another loan that the customer 163 may or may not accept. If the customer 163 accepts the loan, the same virtual credit card may be set to the credit limit associated with the loan amount of the current accepted loan.

During the payment process, the merchant can receive the amount of the purchase during the purchase transaction, where the amount can be equal to or less than the selected credit or loan amount that a customer is approved for under the selected product. The payment transfer can occur in a number of ways, including a transfer of the amount from the lender, transfer of the amount from the banking partner alone or in association with the PCI vendor transaction. In some embodiments, the lender can establish an escrow with the merchant to cover the payment amounts across a plurality of lending products. For example, an escrow account can be established with the merchant in an amount sufficient to pay for a month's worth of loan products. When a loan is agreed to by the customer, and a transaction is performed on the basis of the loan amount, the merchant can deduct the transaction amount from the escrow funds to complete the transaction.

When an escrow is used to enable the transfer of funds to the merchant during a transaction, the escrow can be maintained by the credit broker system (e.g., the credit broker application 176 on the seller blockchain node 108 of FIG. 6), which can be part of the merchant system 162 and/or part of the credit broker system external to the merchant. The escrow can be maintained in connection with the banking partner as part of the credit broker system at the merchant or external to the merchant.

Figure 7:
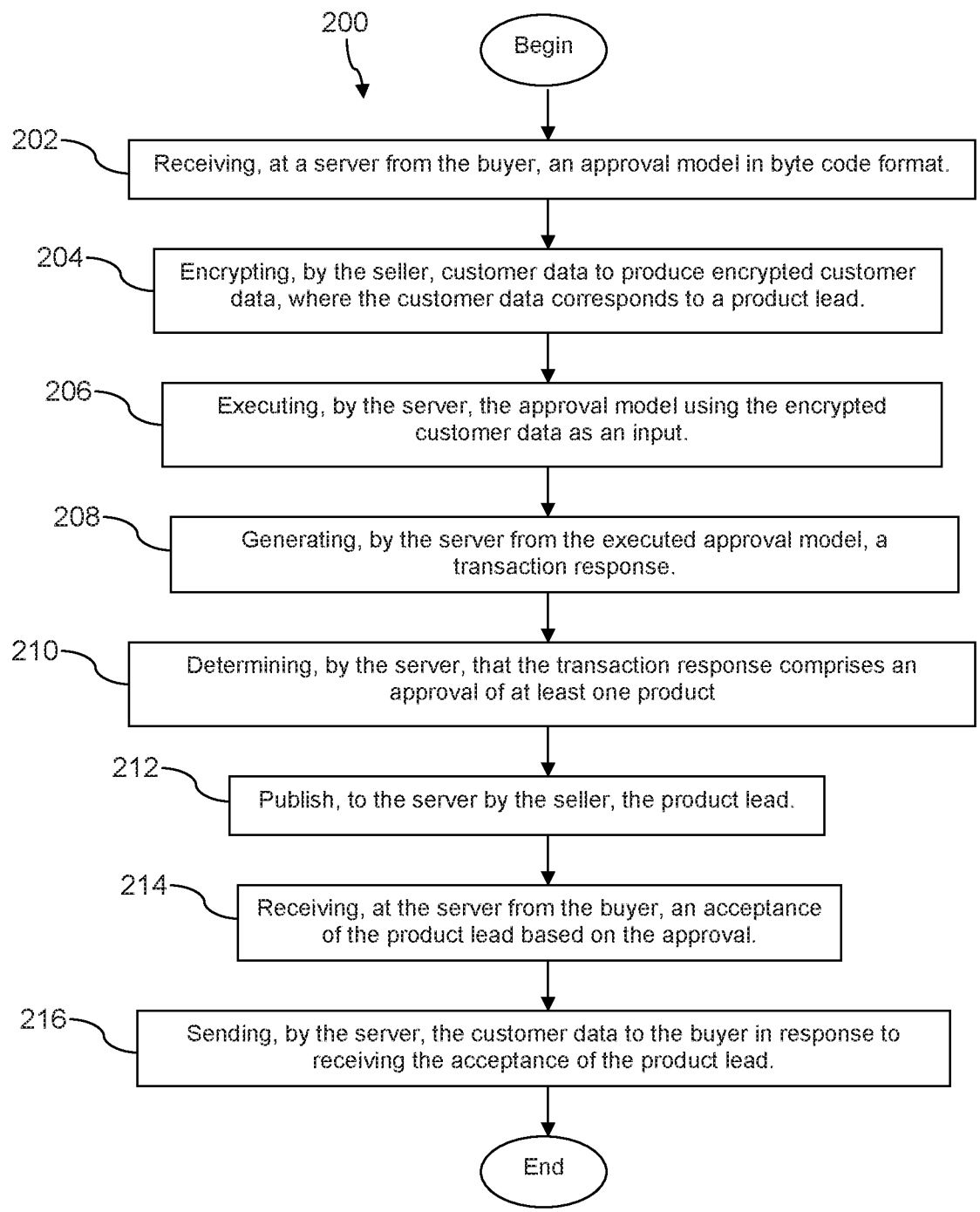
FIG. 7 is a flow chart of a method according to an embodiment of the disclosure.

Turning now to FIG. 7, a method 200 is described. In an embodiment, the method 200 is a method of anonymously matching a buyer to a seller. For example, a buyer of a lead to a customer is found to match the lead offered by the seller. The seller may be a lender who is offering the opportunity to another lender to make the loan to the customer, for example in the instance where the lender does not want to provide the loan itself. Alternatively the seller may be a merchant who is hoping to sell a consumer product to the customer, based on the customer obtaining a loan to finance payment for the consumer product. In some embodiments, the buyer can be associated with a healthcare insurance provider. In some embodiments, the buyer can be associated with a financial credit lender. The method 200 may be performed at least in part by a blockchain system such as any of the blockchain systems described with respect to FIGS. 1-4 such as blockchain system 106, for example by one or more applications executing on the seller blockchain node 108.

At block 202, the method 200 comprises receiving, at a server from the buyer, an approval model in byte code format. For example, the seller blockchain server 116 receives an approval model in byte code format from the buyer blockchain node 112 or from the buyer blockchain server 120. The approval model in byte code format may be referred to as an approval model byte code package or approval model byte code file in some contexts. It is understood that the processing of block 202 may occur several different times, as different approval model byte code packages are delivered to the seller blockchain server 116. A plurality of different approval model byte code packages may be delivered to the seller blockchain server 116, for example different byte code packages corresponding to different approval models that can be concurrently valid or replacement approval models over time (e.g., a second approval model replacing an earlier approval model in the blockchain). A first approval model may be associated with a first range of customer credit scores or a first range of loan amounts. A second approval model may be associated with a second range of customer credit scores or a second range of loan amounts. These different approval models may be said to be associated with different loan products or credit products. In some cases, the processing of block 202 may involve replacing an approval model previously received by the seller blockchain server 116 with a different version of approval model that is received in block 202, for example an updated version of the approval model. In an embodiment, the server is located on a seller premises or on a seller business location. It is noted that the presence of the approval model byte code on the server does not imply or provide access to the source code version of the approval model, which may be retained confidential in either the buyer blockchain node 112 and/or in the buyer system 104.

At block 204, the method 200 comprises encrypting, by the seller, customer data to produce encrypted customer data, where the customer data corresponds to a product lead. The encryption of the customer data may be performed by a trusted execution environment present on the seller blockchain server 116, for example the trusted execution environment 134 described with reference to FIG. 3 above. The customer data may comprise PII that the seller desires and/or is obligated to retain in confidence and to secure.

At block 206, the method 200 comprises executing, by the server, the approval model byte code using the encrypted customer data as an input. Part of the processing of block 206 may involve decrypting the customer data. The customer data is provided as input to the approval model byte code during execution of the approval model byte code. The customer data may comprise tens of parameters or hundreds of parameters. In an embodiment, the customer data may comprise a list of 150 to 200 different items of information. In an embodiment, the approval model byte code is able to parse the list of customer data and extract and use those customer information parameters it desires and ignore other customer information parameters. At block 208, the method 200 comprises generating, by the server from the executed approval model, a transaction response. The transaction response may be an accept response or a reject response or some other response. In an embodiment, receiving the approval model from the buyer at the server during processing of block 202 comprises receiving the approval model in an encrypted byte code format and storing the approval model in the encrypted byte code format on the server, and executing the approval model by the server during the processing of block 206 comprises creating a decrypted approval model in byte code format by decrypting the approval model in encrypted byte code format, executing the decrypted approval model, and deleting the decrypted approval model after the execution.

At block 210, the method 200 comprises determining, by the server, that the transaction response comprises an approval of at least one product. The product may be a credit product or a loan product. The product may correspond to a particular set of terms and conditions and a maximum loan amount. In an embodiment, the processing of block 210 may determine a plurality of approvals, for example by performing the processing of blocks 206 and 208 in parallel for a plurality of different approval model byte code packages. At block 212, the method 200 comprises publishing, to the server by the seller, the product lead. The processing of block 212 may further comprise providing the lead to the buyer, for example via a blockchain transaction directed to the buyer blockchain node 112. In an embodiment, the blockchain transaction directed to the buyer blockchain node 112 is a private blockchain transaction.

At block 214, the method 200 comprises receiving, at the server from the buyer, an acceptance of the product lead based on the approval. In an embodiment, the acceptance of the product lead is received as a private blockchain transaction by the seller blockchain node 108. At block 216, the method 200 comprises sending, by the server, the customer data to the buyer in response to receiving the acceptance of the product lead. In an embodiment, the processing of block 216 may comprise the seller blockchain node 108 sending the customer data as a private blockchain transaction to the buyer blockchain node 112. Alternatively, the seller system 102 may communicate with the buyer system 104 via the network 110 independently of the blockchain system 106 to provide the customer data to the buyer. The method 200 may further comprise transferring a transaction amount from a buyer escrow account to a seller account in response to the acceptance of the product lead.

Figure 8:
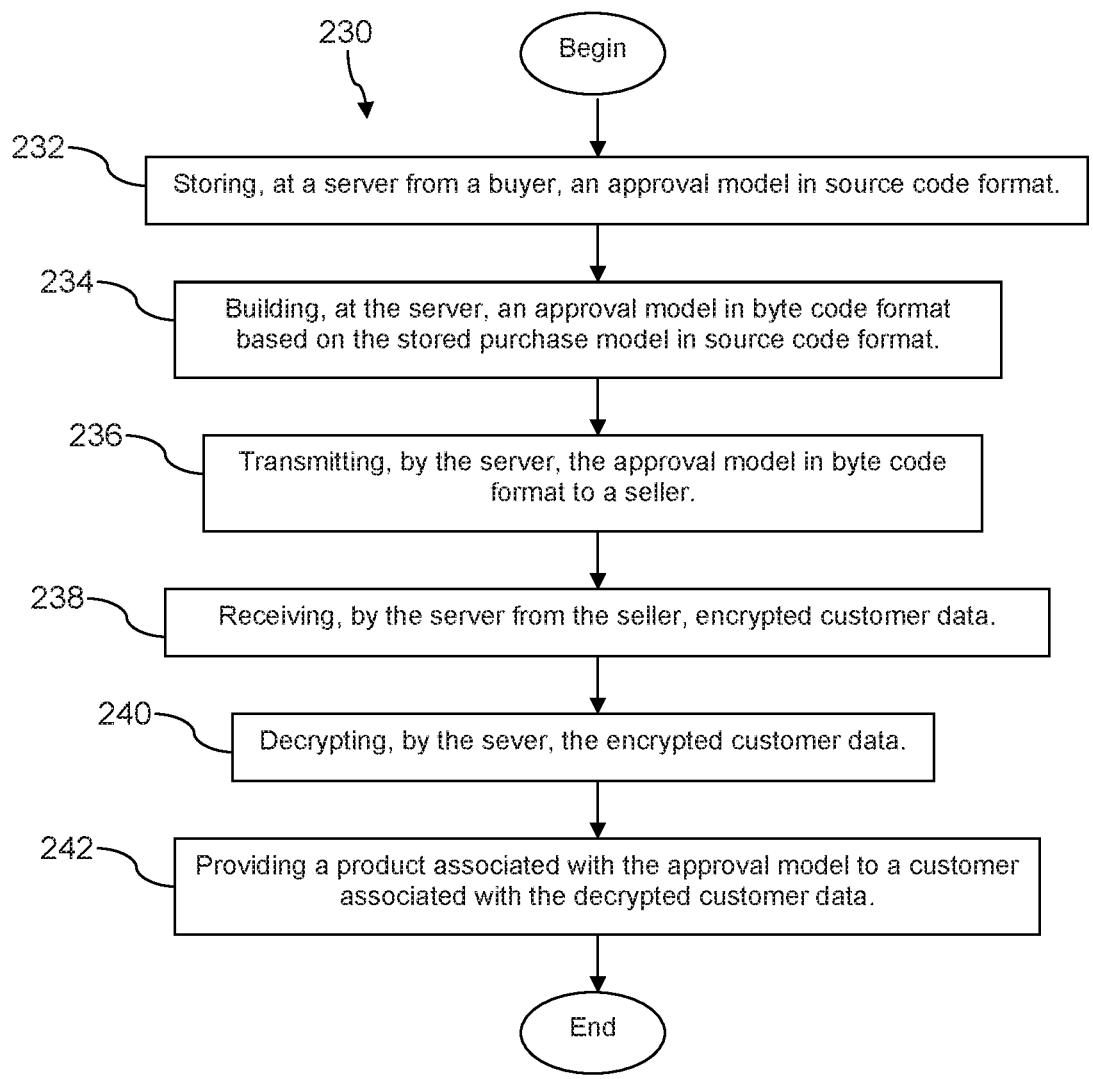
FIG. 8 is a flow chart of another method according to an embodiment of the disclosure.

Turning now to FIG. 8, a method 230 is described. In an embodiment, the method 230 is a method of anonymously matching a buyer to a seller. At block 232, the method 230 comprises storing, at a server from a buyer, an approval model in source code format. For example the source code is stored by the buyer system 104 in the buyer blockchain node 112. At block 234, the method 230 comprises building, at the server, an approval model in byte code format based on the stored approval model in source code format. For example, the approval model in source code format is compiled into the approval model in byte code format by a compiler tool. For example, the approval model source code is processed into the approval model in byte code format by a software development kit (SDK). Alternatively, the approval model in source code format is stored on the buyer system 104 and processed into the approval model in byte code format by the buyer system 104 and then is provided to the buyer blockchain node 112 in approval model byte code format.

At block 236, the method 230 comprises transmitting, by the server, the approval model in byte code format to a seller. For example, the buyer blockchain node 112 sends the approval model in byte code format to the seller blockchain node 108 as a private blockchain transaction. At block 238, the method 230 comprises receiving, by the server from the seller, encrypted customer data. For example, the buyer blockchain node 112 receives the encrypted customer data in a private blockchain transaction from the seller blockchain node 108. It is noted that receiving the encrypted customer data by the buyer blockchain node 112 indicates that the buyer has been selected to extend credit to a customer or to provide an offer of credit to a customer after the customer has been prequalified by the seller blockchain node 108 based on the seller's approval model byte code promulgated to the seller blockchain node 108 (e.g., promulgated via the processing of block 236).

At block 240, the method 230 comprises decrypting, by the sever, the encrypted customer data. At block 242, the method 230 comprises providing a product associated with the approval model to a customer associated with the decrypted customer data. For example, the buyer blockchain node 112 provides terms and conditions of a loan to the customer. For example, the buyer blockchain node 112 informs the buyer system 104, and the buyer system 104 provides terms and conditions of the loan to the customer. The processing of block 240 may further comprise transferring funds to the seller, for example to a lender who has provided the customer lead or to a merchant who is selling a consumer product to the customer paid for with the credit conferred to the customer by the buyer system 104.

Figure 9:
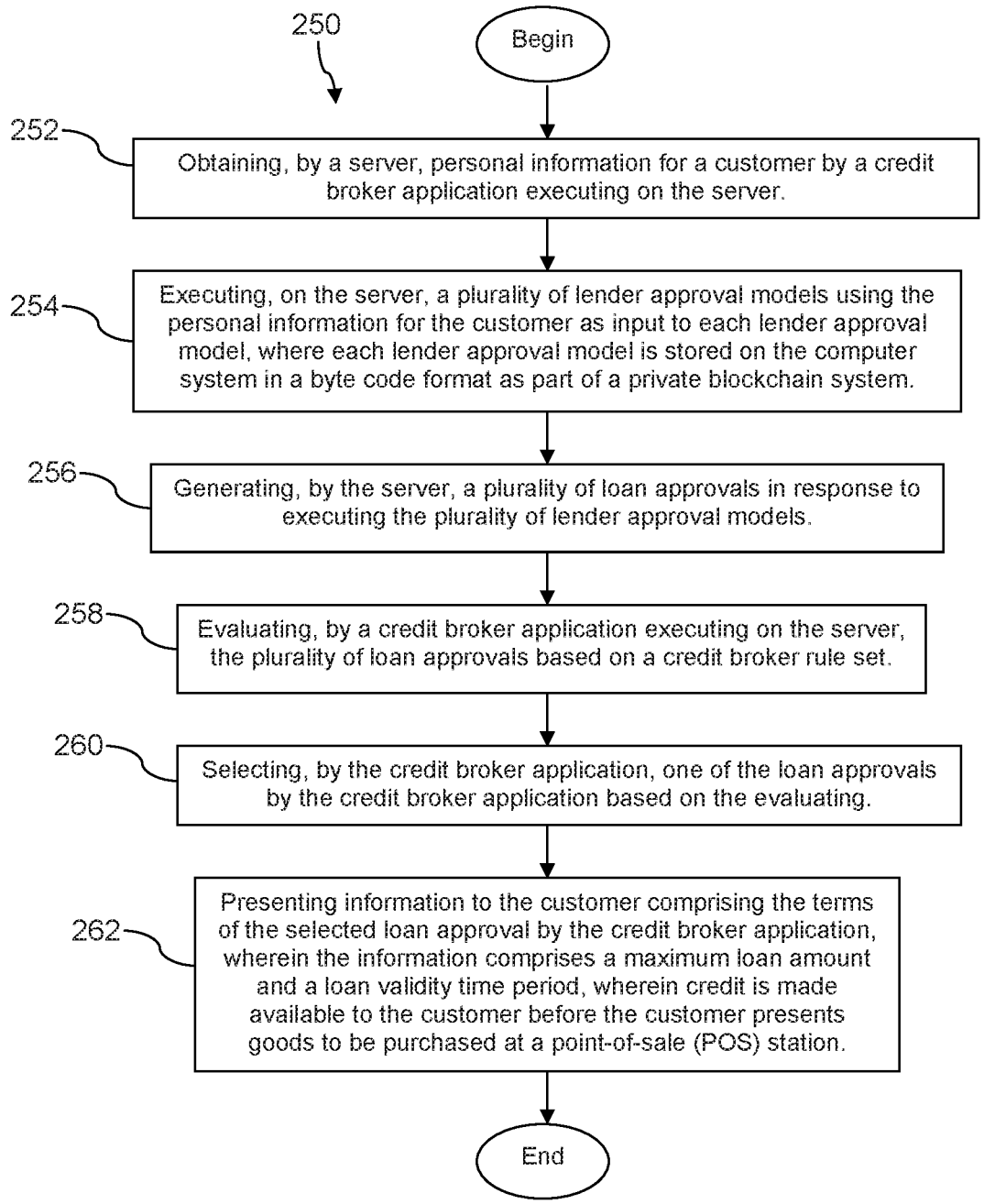
FIG. 9 is a flow chart of another method according to an embodiment of the disclosure.

Turning now to FIG. 9, a method 250 is described. In an embodiment, method 250 comprises a method of providing a loan credit to a customer before the customer requests the loan. At block 252, the method 250 comprises obtaining, by a server, personal information for a customer by a credit broker application executing on the server. In an embodiment, the server is a blockchain server. In an embodiment, the server executes a blockchain server application. At block 254, the method 250 comprises executing, on the server, a plurality of lender approval models using the personal information for the customer as input to each lender approval model, where each lender approval model is stored on the computer system in a byte code format as part of a private blockchain system.

At block 256, the method 250 comprises generating, by the server, a plurality of loan approvals in response to executing the plurality of lender approval models. In an embodiment, the loan approvals generated pursuant to block 256 are generated without contacting lenders associated with the lender approval models. At block 258, the method 250 comprises evaluating, by a credit broker application executing on the server, the plurality of loan approvals based on a credit broker rule set. At block 260, the method 250 comprises selecting, by the credit broker application, one of the loan approvals by the credit broker application based on the evaluating. At block 262, the method 250 comprises presenting information to the customer comprising the terms of the selected loan approval by the credit broker application, wherein the information comprises a maximum loan amount and a loan validity time period, wherein credit is made available to the customer before the customer presents goods to be purchased at a point-of-sale (POS) station. In an embodiment, the terms of the selected loan approval may further comprise an effective annual percentage rate (APR) and/or an estimate of monthly payments. In an embodiment, the information is presented to the customer via a web site associated with the merchant, via a text message, via an email. In an embodiment, the information is presented to the customer via a merchant kiosk, for example via a kiosk located in a store of the merchant.

In an embodiment, the method 250 further comprises receiving, at the server, an acceptance from the customer of the selected loan approval and using a loan associated with the selected loan approval to pay for a purchase by the customer from the merchant. The ability to present the loan information to the customer can allow for a simple way for the customer to accept the loan. For example, a single click or acceptance can be used by the customer to indicate acceptance of the presented loan product. In an embodiment, the server is located in the merchant's computer system. In an embodiment, the server is located on the physical premises of the merchant, whereby the merchant is able to provide physical security for the server (e.g., prevent unauthorized personnel from gaining access to the server).

Figure 10:
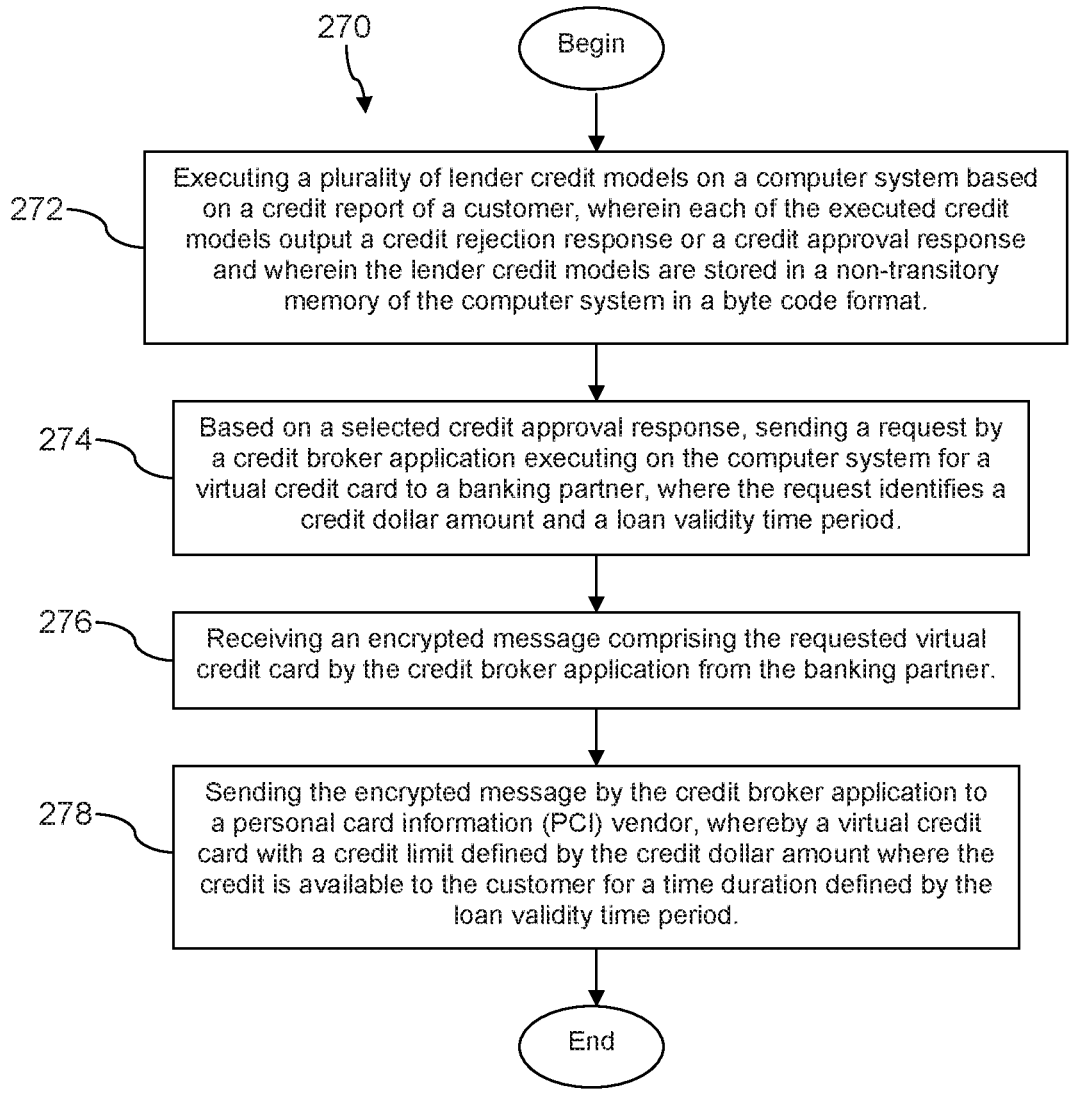
FIG. 10 is a flow chart of another method according to an embodiment of the disclosure.

Turning now to FIG. 10, a method 270 is described. In an embodiment, the method 270 comprises a method of providing credit to a customer. At block 272, the method 270 comprises executing a plurality of lender credit models on a computer system based on a credit report of a customer, wherein each of the executed credit models output a credit rejection response or a credit approval response and wherein the lender credit models are stored in a non-transitory memory of the computer system in a byte code format. At block 274, the method 270 comprises, based on a selected credit approval response, sending a request by a credit broker application executing on the computer system for a virtual credit card to a banking partner, where the request identifies a credit dollar amount and a loan validity time period.

At block 276, the method 270 comprises receiving an encrypted message comprising the requested virtual credit card by the credit broker application at the merchant from the banking partner. At block 278 the method 270 comprises sending the encrypted message by the credit broker application to the merchant (e.g., to the merchant API and/or processing systems). The merchant can then send the encrypted message to a personal card information (PCI) vendor, whereby a virtual credit card with a credit limit defined by the credit dollar amount is made available for process. The credit is available to the customer for a time duration defined by the loan validity time period.

In an embodiment, the method 270 further comprises receiving by the computer system from the customer at a first time a payment authorization for the virtual credit card to purchase a first product from the merchant, wherein a first purchase amount of the first product is less than the credit limit on the virtual credit card; and processing a first payment to the merchant for the purchase of the first product. In an embodiment, the method 270 further comprises receiving by the computer system from the customer at a second time a payment authorization for the virtual credit card to purchase a second product from the merchant, wherein the second time is later than the first time and wherein a second purchase amount of the second product is less than a remaining credit limit on the virtual credit card; and processing a second payment to the merchant for the purchase of the second product. In an embodiment, the method of 270 further comprises receiving by the computer system from the customer at a time after expiration of the loan validity time period a payment authorization for the virtual credit card to purchase a third product from the merchant, wherein a third purchase amount of the third product is less than the credit limit on the virtual credit card; and rejecting the payment method based on the virtual credit card.

Within the method 270, a payment amount can be received by the merchant to pay for the product, whereupon the customer can receive the product in exchange for the obligations incurred under the loan. The payment can be obtained from the banking partner and/or the PCI vendor. In some embodiments, an escrow can be maintained by the merchant, where the escrow contains funds specific to the selected loan product or funds available for a plurality of loan products provided by the lender. For example, each lender can maintain an escrow with the merchant (e.g., as maintained by the credit broker systems on the merchant systems, etc.) with funds available to draw from as part of the payment process. When a product is selected that is within the approved loan amount, the merchant can deduct the amount for the purchase from the escrow of the lender of the selected loan product. This process can continue until the escrow drops below a threshold, at which time the lender can provide additional funds to the escrow in order to continue to provide loan products. The amount deducted can be sent in a message to the banking partner and lender to indicate the amount of the loan provided to the customer, thereby incurring the repayment amounts on the amount used. The ability to maintain the escrow at the merchant allow the merchant to immediately obtain the funds for the transaction without needing to wait for the lender to transfer funds to the merchant. The availability of funds in the escrow may be a factor in the lender selected for the loan product presented to the customer as part of the credit broker application rule set.

While the method 270 is described with respect to approval models for loan products, the method 270 an also be used in other industries such as the healthcare industry. In some embodiments, the method can be used for a healthcare exchange for health insurance and/or for providing healthcare services. For example, the buyers could be purchasing leads as healthcare insurance providers, and the sellers could be healthcare insurance brokers. Alternatively, the buyers could represent healthcare providers (e.g., doctors, hospitals, medical testing centers, diagnostic centers, etc.), and the merchants could be healthcare service brokers or services. In an embodiment, the method 270 can comprises a method of providing healthcare insurance or services to a patient. The method can comprises executing a plurality of approval models on a computer system based on the personal information and/or healthcare information or history of a patient, wherein each of the executed approval models output a rejection response or an approval response. For example, a healthcare insurance approval model could provide a rejection or approval for healthcare insurance along with one or more insurance products. Similarly, a healthcare provider approval model could provide an approval or rejection of an ability to provide services based on the patient's insurance coverage, medical history, diagnosis, or the like. The healthcare approval models can be stored in a non-transitory memory of the computer system in a byte code format.

When one or more approvals are received, the healthcare insurance product and/or healthcare services can be presented to the patient or a healthcare broker selection model can execute to select the healthcare product for the patient. When a patient approves of the healthcare insurance product or healthcare service, the healthcare broker system can provide the personally identifiable information, health information, and the like to the healthcare insurance provider or healthcare services provider. The patient can then receive the insurance or service from the healthcare provider, and the healthcare broker can complete a lead transaction with the health insurance provider and/or healthcare service provider. Within this system, the use of a private blockchain allows for the healthcare provider approval models to be maintained securely on the healthcare broker system, protect patient information, and allows for patients to obtain the benefits of seeking approvals from a plurality of providers and healthcare products.

Figure 11:
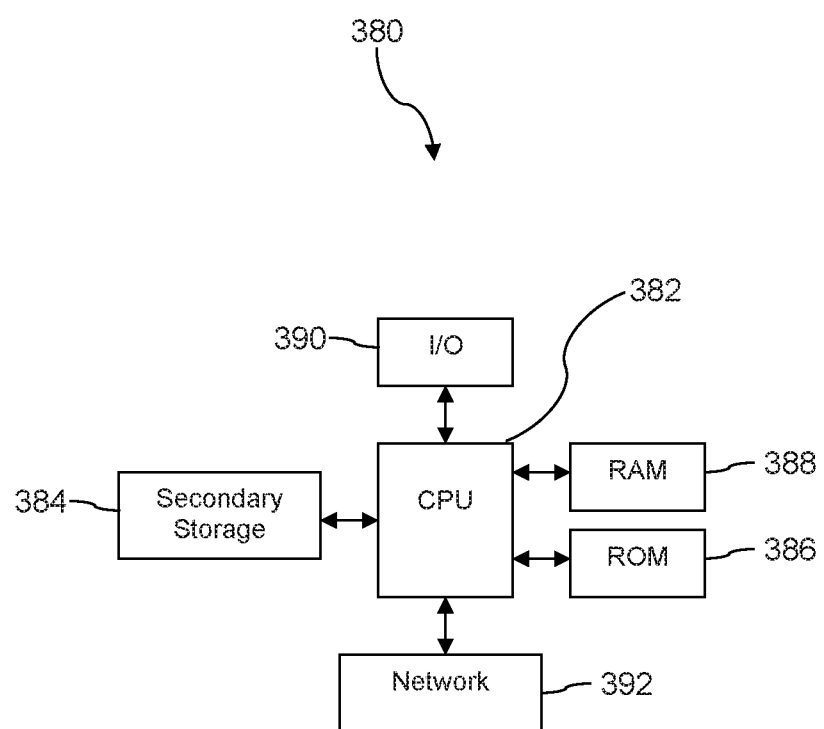
FIG. 11 is a block diagram of a computer system according to an embodiment of the disclosure.

FIG. 11 illustrates a computer system 380 suitable for implementing one or more embodiments disclosed herein. For example, the seller system 102 may be implemented by a first computer system, the buyer system 104 may be implemented by a second computer system, the seller blockchain node 108 may be implemented by a third computer system, and the buyer blockchain node 112 may be implemented by a fourth computer system. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

Having described various systems and methods herein, certain embodiments can include, but are not limited to:

In a first embodiment, a method of providing a loan credit to a customer before the customer requests the loan comprises: obtaining, by a server, personal information for a customer by a credit broker application executing on the server; executing, on the server, a plurality of lender approval models using the personal information for the customer as input to each lender approval model, where each lender approval model is stored on the computer system in a byte code format as part of a private blockchain system; generating, by the server, a plurality of loan approvals in response to executing the plurality of lender approval models; evaluating, by a credit broker application executing on the server, the plurality of loan approvals based on a credit broker rule set; selecting, by the credit broker application, one of the loan approvals by the credit broker application based on the evaluating; and presenting information to the customer comprising the terms of the selected loan approval by the credit broker application, wherein the information comprises a maximum loan amount and a loan validity time period, wherein credit is made available to the customer before the customer presents goods to be purchased at a point-of-sale (POS) station.

A second embodiment can include the method of the first embodiment, wherein the credit broker rule set defines a rule that examines at least one of a history of customer loan acceptances for the lenders associated with the loan approvals, a ranking of the lenders associated with the loan approvals, and a ranking of terms of the loans.

A third embodiment can include the method of the first or second embodiment, further comprising: receiving, at the server, an acceptance from the customer of the selected loan approval; and using a loan associated with the selected loan approval to pay for a purchase by the customer from the merchant.

A fourth embodiment can include the method of the third embodiment, wherein the server is located in the merchant's node.

A fifth embodiment can include the method of any one of the first to fourth embodiments, wherein the plurality of loan approvals are generated without contacting lenders associated with the lender approval models.

A sixth embodiment can include the method of any one of the first to fifth embodiments, wherein the server comprises a blockchain server.

A seventh embodiment can include the method of any one of the first to sixth embodiments, wherein the information is presented to the customer via a web site associated with the merchant.

An eighth embodiment can include the method of any one of the first to seventh embodiments, wherein the information is presented to the customer via a merchant kiosk.

A ninth embodiment can include the method of any one of the first to eighth embodiments, wherein the information is presented to the customer via one of a mobile application, a text message, or an email.

In a tenth embodiment, a computer system for mediating loans to customers comprises: a processor; a non-transitory memory; a plurality of lender approval models stored in the non-transitory memory in byte code format as part of a private blockchain system that each, when executed by the processor, analyzes personal information for a customer to produce a credit rejection response or a credit approval response, wherein a credit approval response comprises a maximum loan amount and a loan validity time period; and a credit broker application stored in the non-transitory memory that, when executed by the processor obtains personal information on the customer, evaluates a plurality of loan approval responses associated with the customer that are output by the lender credit models based on a credit broker rule set, selects one of the loan approvals based on the evaluating, and presents information to the customer comprising the terms of the selected loan approval, wherein the information comprises the maximum loan amount and the loan validity time period of the selected loan approval, wherein credit is made available to the customer before the customer presents goods to be purchased at a point-of-sale (POS) station.

An eleventh embodiment can include the system of the tenth embodiment, wherein the credit broker rule set defines a rule that examines at least one of a history of customer loan acceptances for the lenders associated with the loan approvals, a ranking of the lenders associated with the loan approvals, and a ranking of the loan terms.

A twelfth embodiment can include the system of the tenth or eleventh embodiment, wherein the system is located at a merchant's physical location.

A thirteenth embodiment can include the system of the twelfth embodiment, wherein the personal information on the customer is not provided to lenders who are not associated with the selected one of the loan approvals.

A fourteenth embodiment can include the system of the twelfth or thirteenth embodiment, wherein the plurality of loan approvals are generated without contacting lenders associated with the lender approval models.

In a fifteenth embodiment, a method of providing credit to a customer comprises: executing a plurality of lender credit models on a computer system based on a credit report of a customer, wherein each of the executed credit models output a credit rejection response or a credit approval response and wherein the lender credit models are stored in a non-transitory memory of the computer system in a byte code format; based on a selected credit approval response, sending a request by a credit broker application executing on the computer system for a virtual credit card to a banking partner, where the request identifies a credit dollar amount and a loan validity time period; receiving an encrypted message comprising the requested virtual credit card by the credit broker application from the banking partner; and sending the encrypted message by the credit broker application to a personal card information (PCI) vendor via a merchant system, whereby a virtual credit card with a credit limit defined by the credit dollar amount where the credit is available to the customer for a time duration defined by the loan validity time period.

A sixteenth embodiment can include the method of the fifteenth embodiment, further comprising receiving by the computer system from the customer at a first time a payment authorization for the virtual credit card to purchase a first product from the merchant, wherein a first purchase amount of the first product is less than the credit limit on the virtual credit card; and processing a first payment to the merchant for the purchase of the first product.

A seventeenth embodiment can include the method of the sixteenth embodiment, further comprising: receiving by the computer system from the customer at a second time a payment authorization for the virtual credit card to purchase a second product from the merchant, wherein the second time is later than the first time and wherein a second purchase amount of the second product is less than a remaining credit limit on the virtual credit card; and processing a second payment to the merchant for the purchase of the second product.

An eighteenth embodiment can include the method of any one of the fifteenth to seventeenth embodiments, further comprising: receiving by the computer system from the customer at a time after expiration of the loan validity time period a payment authorization for the virtual credit card to purchase a third product from the merchant, wherein a third purchase amount of the third product is less than the credit limit on the virtual credit card; and rejecting the payment method based on the virtual credit card.

A nineteenth embodiment can include the method of any one of the fifteenth to eighteenth embodiments, wherein the plurality of lender credit models are executed without contacting lenders associated with the lender approval models.

A twentieth embodiment can include the method of any one of the fifteenth to nineteenth embodiments, further comprising selecting a credit approval response by the credit broker application based on executing a credit broker rules set.

In a twenty first embodiment, a method of verifying a loan credit to a customer comprises: receiving, by a server, personal information for a customer from a first credit broker application; executing, on the server, a lender approval model using the personal information for the customer as input to the lender approval model; generating, by the server, one or more first loan approvals in response to executing the lender approval model, wherein the one or more first loan approvals comprise executable code representative of a first loan product; receiving, by the server, an acceptance by the customer of the first loan product; receiving, by the server, personal information for the customer from a second credit broker application; executing, on the server, the lender approval model using the personal information for the customer as input to the lender approval model; generating, by the server, one or more second loan approvals in response to executing the lender approval model, wherein the one or more second loan approvals comprise executable code representative of a second loan product; receiving, by the server, an indication of an acceptance of the second loan product; and rejecting, by the server, the acceptance of the second loan product based on the acceptance by the customer of the first loan product.

A twenty second embodiment can include the method of the twenty first embodiment, wherein the executable code representative of the second loan product comprises a list customers having accepted loan products, and wherein rejecting the acceptance of the second loan product comprises: comparing the customer information to the list of customers; identifying the customer within the list of customers; and rejecting the acceptance of the second loan product based on identifying the customer within the list of customers.

A twenty third embodiment can include the method of the twenty first or twenty second embodiment, wherein rejecting the acceptance of the second loan product comprises: sending, by the server, a transaction to a blockchain server with the customer information; identifying the acceptance of the first loan product within a blockchain created by the blockchain server; and rejecting the acceptance of the second loan product based on identify the acceptance of the first loan product within the blockchain.

A twenty fourth embodiment can include the method of any one of the twenty first to twenty third embodiment, further comprising: providing the first loan product to the customer based on the acceptance of the first loan product; and creating, by the server, a transaction on a blockchain network to enter the customer information into a blockchain in response to providing the first loan product to the customer.

A twenty fifth embodiment can include the method of any one of the twenty first to twenty fourth embodiments, further comprising: providing funds to the customer based on the acceptance of the first loan product.

A twenty sixth embodiment can include the method of any one of the twenty first to twenty fifth embodiments, wherein the server is located on a lender system.

A twenty seventh embodiment can include the method of any one of the twenty first to twenty sixth embodiments, wherein the server comprises a blockchain node on a private blockchain network. The systems and processes described herein can provide for an identification of available lending options for customers making purchases from loan originators such as merchants where the customer data is retained on the loan originator's systems. This can provide more secure lending processes that are safer for the customer's personal data while providing access to multiple lenders having models that are not available in a readable format to the loan originator.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of providing a loan credit to a customer before the customer requests the loan comprising:
    obtaining, by a loan originator server, personal information for a customer by a credit broker application executing on the server;
    executing, on the loan originator server, a plurality of lender approval models associated with a plurality of different lenders in parallel using the personal information for the customer as input to each lender approval model, wherein credit information is only pulled once from a third party credit scoring bureau during execution of the plurality of lender approval models in parallel, and wherein each lender approval model is stored on the loan originator server in a byte code format as part of a private blockchain system;
    generating, by the loan originator server, a plurality of loan approvals in response to executing the plurality of lender approval models in parallel;
    evaluating, by a credit broker application executing on the loan originator server, the plurality of loan approvals based on a credit broker rule set;
    selecting, by the credit broker application, one of the loan approvals based on the evaluating; and
    presenting information to the customer comprising the terms of the selected loan approval by the credit broker application, wherein the information comprises a maximum loan amount and a loan validity time period, wherein credit is made available to the customer before the customer presents goods to be purchased at a point-of-sale (POS) station.

2. The method of claim 1, wherein the credit broker rule set defines a rule that examines at least one of a history of customer loan acceptances for the lenders associated with the loan approvals, a ranking of the lenders associated with the loan approvals, and a ranking of terms of the loans.

3. The method of claim 1, further comprising:
    receiving, at the server, an acceptance from the customer of the selected loan approval, wherein the server is located in the merchant's node; and
    using a loan associated with the selected loan approval to pay for a purchase by the customer from a merchant.

4. The method of claim 1, wherein the server comprises a blockchain server.

5. The method of claim 1, wherein the information is presented to the customer via a web site associated with the merchant or a merchant kiosk.

6. The method of claim 1, wherein the information is presented to the customer via one of a mobile application, a text message, or an email.

7. The method of claim 1, wherein the personal information of the customer is retained on the loan originator server while executing the plurality of lender approval models.

8. A loan originator computer system for mediating loans to customers, comprising:
    a processor;
    a non-transitory memory;
    a plurality of lender approval models associated with a plurality of different lenders stored in the non-transitory memory of the loan originator computer system in byte code format as part of a private blockchain system that each, when executed by the processor, analyzes personal information for a customer to produce a credit rejection response or a credit approval response, wherein a credit approval response comprises a maximum loan amount and a loan validity time period; and a credit broker application stored in the non-transitory memory that, when executed by the processor:
obtains personal information on the customer,
executes at least two of the plurality of lender approval models associated with the plurality of different lenders in parallel using the personal information for the customer as input to each lender approval model, wherein credit information is only pulled once from a third party credit scoring bureau during execution of the at least two of the plurality of lender approval models in parallel,
evaluates a plurality of loan approval responses associated with the customer that are output by the at least two of the plurality of lender approval models based on a credit broker rule set,
selects one loan approval of the plurality of loan approvals based on the evaluation, and
presents information to the customer comprising the terms of the selected loan approval, wherein the information comprises the maximum loan amount and the loan validity time period of the selected loan approval, wherein credit is made available to the customer before the customer presents goods to be purchased at a point-of-sale (POS) station.

9. The system of claim 8, wherein the credit broker rule set defines a rule that examines at least one of a history of customer loan acceptances for the lenders associated with the loan approvals, a ranking of the lenders associated with the loan approvals, and a ranking of the loan terms.

10. The system of claim 8, wherein the system is located at a merchant's physical location.

11. The system of claim 10, wherein the personal information on the customer is not provided to lenders who are not associated with the selected one of the loan approvals.

12. The system of claim 10, wherein the credit information is only pulled once from the third party credit scoring bureau without contacting lenders associated with the at least two of the plurality of lender approval models.

13. A method of providing credit to a customer, comprising:
executing a plurality of lender credit models associated with different lenders in parallel on a loan originator computer system based on a credit report of a customer, wherein credit information is only pulled once from a third party credit scoring bureau during execution of the plurality of lender credit models in parallel, wherein each of the executed credit models output a credit rejection response or a credit approval response, and wherein the lender credit models are stored in a non-transitory memory of the loan originator computer system in a byte code format;
based on a selected credit approval response, sending a request by a credit broker application executing on the loan originator computer system for a virtual credit card to a banking partner, where the request identifies a credit dollar amount and a loan validity time period;
receiving an encrypted message comprising the requested virtual credit card by the credit broker application from the banking partner; and
sending the encrypted message by the credit broker application to a personal card information (PCI) vendor via a merchant system, whereby a virtual credit card with a credit limit defined by the credit dollar amount where the credit is available to the customer for a time duration defined by the loan validity time period.

14. The method of claim 13, further comprising:
receiving by the computer system from the customer at a first time a payment authorization for the virtual credit card to purchase a first product from the merchant, wherein a first purchase amount of the first product is less than the credit limit on the virtual credit card; and
processing a first payment to the merchant for the purchase of the first product.

15. The method of claim 14, further comprising:
receiving by the computer system from the customer at a second time a payment authorization for the virtual credit card to purchase a second product from the merchant, wherein the second time is later than the first time and wherein a second purchase amount of the second product is less than a remaining credit limit on the virtual credit card; and
processing a second payment to the merchant for the purchase of the second product.

16. The method of claim 13, further comprising:
receiving by the computer system from the customer at a time after expiration of the loan validity time period a payment authorization for the virtual credit card to purchase a third product from the merchant, wherein a third purchase amount of the third product is less than the credit limit on the virtual credit card; and
rejecting the payment method based on the virtual credit card.

17. The method of claim 13, wherein the plurality of lender credit models are executed without contacting lenders associated with the lender approval models.

18. The method of claim 13, further comprising selecting a credit approval response by the credit broker application based on executing a credit broker rules set.

* * * * *